(12) United States Patent
Marcouiller et al.

(10) Patent No.: US 8,333,519 B2
(45) Date of Patent: Dec. 18, 2012

(54) SPLICE OF FIBER OPTIC CABLES

(75) Inventors: Thomas Marcouiller, Shakopee, MN (US); Tim Redmann, Carver, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 362 days.

(21) Appl. No.: 12/548,600

(22) Filed: Aug. 27, 2009

(65) Prior Publication Data
US 2010/0086266 A1 Apr. 8, 2010

Related U.S. Application Data

(60) Provisional application No. 61/093,141, filed on Aug. 29, 2008.

(51) Int. Cl.
*G02B 6/255* (2006.01)
*G02B 6/00* (2006.01)

(52) U.S. Cl. .............. 385/95; 385/96; 385/135

(58) Field of Classification Search .............. None
See application file for complete search history.

(56) References Cited

U.S. PATENT DOCUMENTS

| | | | |
|---|---|---|---|
| 3,441,659 A | 4/1969 | Laudig et al. | |
| 4,196,965 A | 4/1980 | Matsuno | |
| 4,773,728 A | 9/1988 | Kershaw | |
| 4,946,249 A | 8/1990 | Barlow et al. | |
| 5,222,176 A | 6/1993 | Webber et al. | |
| 5,727,100 A | 3/1998 | Grajewski et al. | |
| 5,748,819 A | 5/1998 | Szentesi et al. | |
| 5,894,536 A | 4/1999 | Rifkin et al. | |
| 6,273,621 B1 | 8/2001 | Eslambolchi et al. | |
| 6,481,903 B1 | 11/2002 | Varma et al. | |
| 6,907,164 B2 | 6/2005 | Lachance et al. | |
| 7,306,382 B2 | 12/2007 | Qian et al. | |
| 7,393,148 B2 | 7/2008 | Allen et al. | |
| 7,410,308 B2 | 8/2008 | Qian et al. | |
| 7,461,983 B1 | 12/2008 | Gurreri et al. | |
| 7,494,289 B1 | 2/2009 | Chen | |
| 2001/0041035 A1* | 11/2001 | Uchida et al. .................... 385/96 |
| 2003/0007755 A1* | 1/2003 | Morita et al. .................... 385/96 |
| 2005/0123262 A1* | 6/2005 | Dowd et al. .................... 385/135 |
| 2007/0127875 A1 | 6/2007 | Allen et al. | |
| 2009/0034916 A1 | 2/2009 | LeBlanc | |

FOREIGN PATENT DOCUMENTS

FR  2 693 805 A1  1/1994
WO  WO 98/15857  4/1998

OTHER PUBLICATIONS

International Search Report and Written Opinion mailed Dec. 10, 2009.

* cited by examiner

*Primary Examiner* — Tina Wong
(74) *Attorney, Agent, or Firm* — Merchant & Gould P.C.

(57) ABSTRACT

The present disclosure relates to techniques for facilitating installing a fiber optic connector at the end of a fiber optic cable. One aspect of the disclosure involves splicing a first fiber optic cable to a second fiber optic cable. The second fiber optic cable may be pre-connectorized. In certain embodiments, a plurality of splice enclosure components are positioned to form a splice enclosure that encloses the portion of an optical fiber of the first cable that is spliced to an optical fiber of the second cable. The splice enclosure protects the optical fibers at the site of the splice and securely holds the strength members of the fiber optic cables. Furthermore, splice enclosure components are positioned to form a cable enclosure that encloses the splice enclosure and exposed portions of the fiber optic cables.

22 Claims, 14 Drawing Sheets

SPLICE OF FIBER OPTIC CABLES

CROSS REFERENCE TO RELATED APPLICATION

This application claims the benefit of U.S. Provisional Patent Application Ser. No. 61/093,141, filed Aug. 29, 2008, which application is hereby incorporated by reference in its entirety.

TECHNICAL FIELD

The present disclosure relates generally to fiber optic cable networks. More specifically, the present disclosure relates the methods for splicing fiber optic cables.

BACKGROUND

Fiber optic telecommunications technology is becoming more prevalent in part because service providers want to deliver high bandwidth communication capabilities to customers. A typical fiber optic telecommunications system includes a network of fiber optic cables (e.g., distribution cables or branch cables such as drop cables or stub cables) routed from a central location (e.g., a service provider's central office) to remote locations in close proximity to subscribers. The fiber optic telecommunications systems also can include additional components, such as fiber distribution hubs housing optical splitters for splitting optical signals and drop terminals providing interconnect locations for facilitating connecting subscribers to the fiber optic network.

U.S. Patent Publication No. 2006/0233506A1, which is hereby incorporated herein by reference in its entirety, discloses a fiber optic network including a distribution cable having factory terminated breakout locations. Each factory terminated breakout location includes a tether having a free end connectorized with a factory installed multi-fiber connector. In the field, the multi-fiber connector allows the tether to be quickly connected to a branch cable. One end of the branch cable includes a multi-fiber connector adapted to interconnect with the multi-fiber connector of the tether to provide optical connections between the optical fibers of the branch cable and the optical fibers of the tether. The other end of the branch cable is connected to a drop terminal.

When an optical connector is installed at the end of an optical cable such as a branch cable, it is often desirable to have a certain length of excess fiber that extends beyond a jacketed end portion of the cable to facilitate the connector installation process. For example, the excess fiber length facilitates low pressure polishing of a ferrule of the fiber optic connector and also facilitates mechanically coupling the fiber optic connector to the fiber optic cable. However, due to friction within the fiber optic cable, it can be difficult to withdraw a sufficient length of fiber from the end of the cable for use during the installation process. This is particularly true for longer lengths of cable (e.g., cable longer than 18 feet). Improved techniques for connectorizing fiber optic cables are needed.

SUMMARY

The present disclosure relates to techniques for facilitating installing a fiber optic connector at the end of a fiber optic cable. One aspect of the disclosure involves splicing a first fiber optic cable to a second fiber optic cable. The second fiber optic cable may be pre-connectorized. In certain embodiments, a plurality of splice enclosure components are positioned to form a splice enclosure that encloses the portion of an optical fiber of the first cable that is spliced (e.g., fusion spliced, mechanically spliced, or otherwise spliced) to an optical fiber of the second cable. The splice enclosure protects the optical fibers at the site of the splice and securely holds the strength members of the fiber optic cables. Furthermore, splice enclosure components are positioned to form a cable enclosure that encloses the splice enclosure and exposed portions of the fiber optic cables.

DETAILED DESCRIPTION

Figure 1:
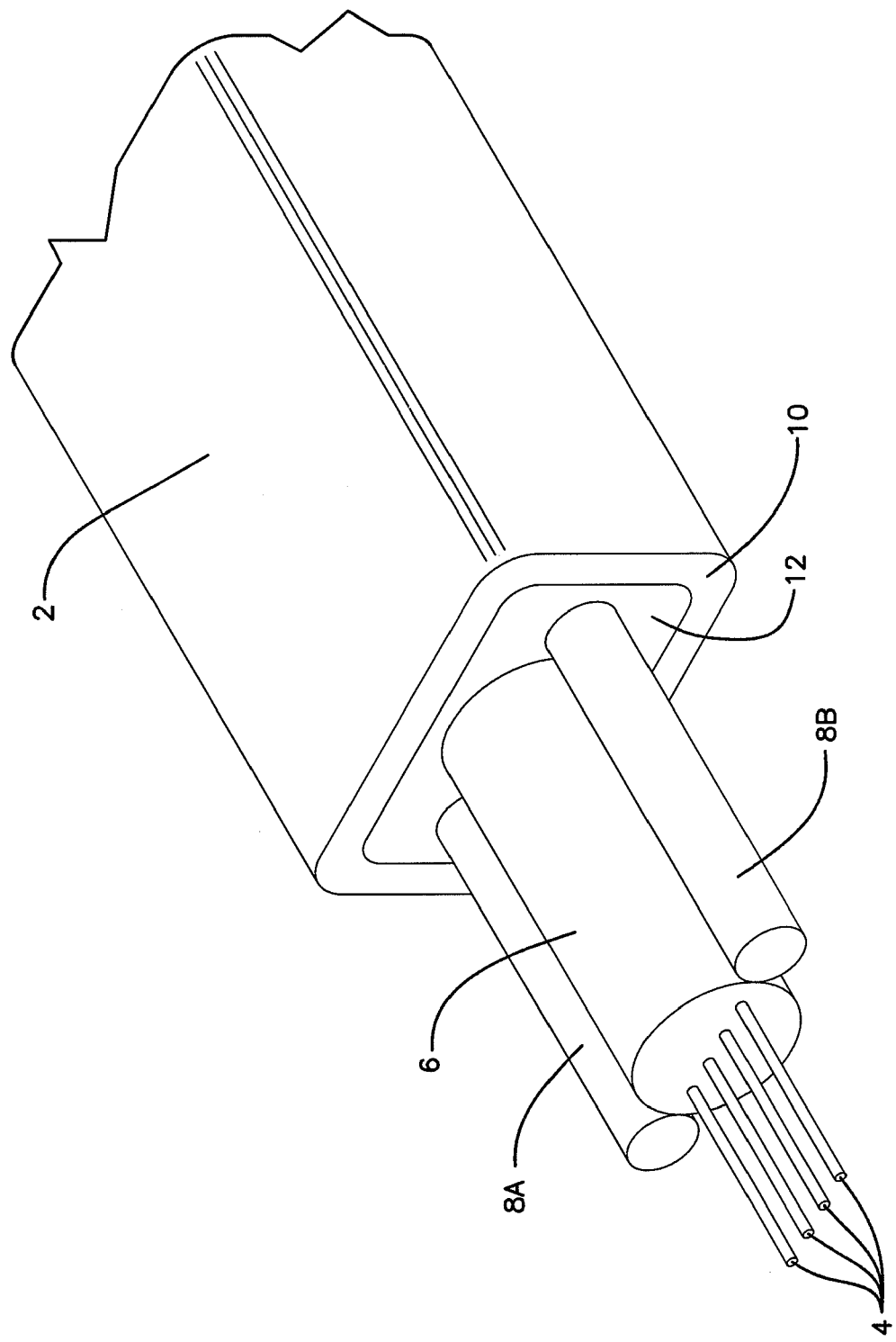
FIG. 1 is a cutaway view of an example fiber optic cable.

As described herein, the techniques of this disclosure may be implemented in many ways. For instance, the techniques of this disclosure may be implemented as a method that comprises providing a first cable that comprises an optical fiber that is capable of transmitting light that conveys data; a buffer tube that surrounds the optical fiber; a strength member that provides additional tensile strength to the first cable; and a jacket that surrounds the strength member, the buffer tube, and the optical fiber. The method also comprises preparing the first cable such that a terminal segment of the optical fiber of the first cable is exposed, a terminal segment of the buffer tube of the first cable is exposed, and a terminal segment of the strength member of the first cable is exposed. In addition, the method comprises providing a second cable that comprises an optical fiber that is capable of transmitting light that conveys data; a buffer tube that surrounds the optical fiber; a strength member that provides additional tensile strength to the second cable; and a jacket that surrounds the strength member, the buffer tube, and the optical fiber. The method also comprises preparing the second cable such that a terminal segment of the optical fiber of the second cable is exposed, a terminal segment of the buffer tube of the second cable is exposed, and a terminal segment of the strength member of the second cable is exposed. Furthermore, the method comprises splicing an exposed end of the optical fiber of the first cable to an exposed end of the optical fiber of the second cable. In addition, the method comprises positioning a plurality of splice enclosure components onto the exposed terminal segment of the strength member of the first cable and the exposed terminal segment of the strength member of the second cable to form a splice enclosure that encloses the fused ends of the optical fiber of the first cable and the optical fiber of the second cable. Moreover, the method comprises positioning a plurality of cable enclosure components onto the splice enclosure to form a cable enclosure that encloses the splice enclosure, the exposed terminal segment of the buffer tube of the first cable, the exposed terminal segment of the buffer tube of the second cable, the exposed terminal segment of the strength member of the first cable, and the exposed terminal segment of the strength member of the second cable. The method also comprises after forming the cable enclosure, sealing the cable enclosure.

In another instance, the techniques of this disclosure may be implemented as a spliced fiber optic cable that comprises a first cable. The first cable comprises an optical fiber that is capable of transmitting light that conveys data. The first cable also comprises a buffer tube that surrounds the optical fiber, except for a terminal segment of the optical fiber. In addition, the first cable comprises a strength member that provides additional tensile strength to the fiber optic cable. Moreover, the first cable comprises a jacket that surrounds the strength member, the buffer tube, and the optical fiber, except for a terminal segment of the buffer tube, a terminal segment of the strength member, and the terminal segment of the optical fiber. The spliced fiber optic cable also comprises a second cable. The second cable comprises an optical fiber that is capable of transmitting light that conveys data. In addition, the second cable comprises a buffer tube that surrounds the optical fiber, except for a terminal segment of the optical fiber. The second cable also comprises a strength member that provides additional tensile strength to the fiber optic cable. Moreover, the second cable comprises a jacket that surrounds the strength member, the buffer tube, and the optical fiber, except for a terminal segment of the buffer tube, a terminal segment of the strength member, and the terminal segment of the optical fiber. An end of the terminal segment of the optical fiber of the first cable is spliced to an end of the terminal segment of the optical fiber of the second cable. An opposite end of the second cable is connectorized. The spliced fiber optic cable also comprises a splice protection sleeve that surrounds a segment of the optical fiber of the first cable and a segment of the optical fiber of the second cable at a point where the optical fiber of the first cable is spliced to the optical fiber of the second cable. In addition, the spliced fiber optic cable comprises a plurality of splice enclosure components that form a splice enclosure that encloses the fused ends of the optical fiber of the first cable and the optical fiber of the second cable, the splice protection sleeve, the strength member of the first cable, and the strength member of the second cable. Furthermore, the spliced fiber optic cable comprises a first splicing tube that surrounds a portion of the exposed terminal segment of the optical fiber of the first cable that extends from the splice enclosure to an end of the exposed terminal segment of the buffer tube of the first cable. In addition, the spliced fiber optic cable comprises a second splicing tube that surrounds a portion of the exposed terminal segment of the optical fiber of the second cable that extends from the splice enclosure to an end of the exposed terminal segment of the buffer tube of the second cable. The spliced fiber optic cable also comprises a plurality of cable enclosure components that form a cable enclosure that encloses the splice enclosure, the exposed terminal segment of the buffer tube of the first cable, the exposed terminal segment of the buffer tube of the second cable, the exposed terminal segment of the strength member of the first cable, the exposed terminal segment of the strength member of the second cable, the first splicing tube, and the second splicing tube. In addition, the spliced fiber optic cable comprises a seal that seals the cable enclosure.

FIG. 1 is a cutaway view of an example fiber optic cable 2. FIG. 1 is provided for purposes of explanation only and is not intended to represent all types of fiber optic cables that can be used with the techniques of this disclosure. For instance, fiber optic cables including more or fewer components may be used with the techniques of this disclosure.

Fiber optic cable 2 is a type of fiber optic cable that is capable of transmitting optical signals such as pulses of light that convey data. Fiber optic cable 2 may be used in a variety of settings. A wide variety of different types of data may be transmitted over fiber optic cable 2. These types of data may include voice data, Internet data, audio/video data, medical data, military data, business data, governmental data, and other types of data. In certain embodiments, fiber optic cable 2 can be used as a branch cable (e.g., a drop or a stub cable) that branches from a branch location of a main trunk of a distribution cable. In certain embodiments, an opposite end of fiber optic cable 2 can be connected to a drop terminal such as the drop terminal disclosed at U.S. patent application Ser. No. 11/728,043, which is hereby incorporated by reference in its entirety.

As illustrated in the example of FIG. 1, fiber optic cable 2 comprises a set of optical fibers 4. Each of optical fibers 4 is capable of transmitting pulses of light that convey data. The number of optical fibers in the set of optical fibers 4 may vary depending on the type of fiber optic cable 2. For instance, some types of fiber optic cable include twelve optical fibers, other types of fiber optic cable may include six optical fibers, and still other types of fiber optic cable may only include a single optical fiber. Each of optical fibers 4 includes a core surrounded by a cladding and one or more protective coatings (e.g., acrylate coatings). The cladding reflects light rays in the core, providing total internal reflection. The core of an optical fiber may be made of a variety of materials including glass and plastic. External surfaces of different ones of optical fibers 4 may be differently colored in order to allow a technician to easily identify optical fibers 4.

A buffer tube 6 surrounds optical fibers 4. Buffer tube 6 may serve several purposes. For instance, buffer tube 6 may provide mechanical isolation of optical fibers 4 from other parts of fiber optic cable 2. In addition, buffer tube 6 may protect optical fibers 4 from physical damage. Buffer tube 6 may be a "loose buffer" that is composed of a plastic tube that can contain a lubricating gel that at least partially fills the voids within buffer tube 6 between optical fibers 4.

In addition to optical fibers 4 and buffer tube 6, fiber optic cable 2 also includes a first strength member 8A and a second strength member 8B (collectively, "strength members 8"). In the example of FIG. 1, strength members 8 are disposed on opposed sides of buffer tube 6. Strength members 8 may serve to provide tensile strength and cut resistance to fiber optic cable 2. Strength members 8 may be composed of a variety of materials including epoxy reinforced with glass rovings.

A jacket 10 surrounds buffer tube 6 and strength members 8. Jacket 10 may be composed of a durable material that protects buffer tube 6 and strength members 8 from damage by external physical forces. For instance, jacket 10 may be composed of a variety of different types of materials including plastic, rubber, resin, or another type of material. Jacket 10 may also serve to hold buffer tube 6 and strength members 8 in appropriate positions relative to one another. As illustrated in the example of FIG. 1, jacket 10 holds buffer tube 6 and strength members 8 together such that strength member 8A, buffer tube 6, and strength member 8B are aligned in a plane that is perpendicular to their lengthwise axes. However, it should be appreciated that jacket 10 may hold buffer tube 6 and strength members 8 in other positions.

Furthermore, fiber optic cable 2 may include a filler 12 that fills any excess space within jacket 10. Filler 12 may serve to prevent buffer tube 6 and strength members 8 from moving excessively within jacket 10. Filler 12 may be composed of glass fibers, plastic fibers, organic fibers, a gel, or some other material.

In many circumstances, fiber optic cables, such as fiber optic cable 2, may be manufactured in long segments. For example, fiber optic cable 2 may be several hundred meters long. One end of fiber optic cable 2 may be connected to a drop terminal and the opposite end may be unconnectorized. To attach a connector to the unconnectorized end fiber optic cable 2, terminal segments of optical fibers 4 preferably extend beyond the end of fiber optic cable 2. For example, when attaching a multi-fiber connector to fiber optic cable 2, it may be desirable for the terminal segments of optical fibers 4 to extend approximately seven inches (~18 centimeters) beyond the ends of jacket 10, strength members 8, and buffer tube 6.

Several issues may arise when attempting to expose terminal segments of optical fibers 4 when attaching a connector to fiber optic cable 2. For example, friction within fiber optic cable 2 may prevent the exposure of terminal segments of optical fibers 4 by telescopically sliding optical fibers 4 out of an end of buffer tube 6 when fiber optic cable 2 is longer than a certain length. In many instances, optical fibers 4 can only slide within buffer tube 6 when the length of fiber optic cable 2 is less than 18 feet. Consequently, an operation other than sliding optical fibers 4 within buffer tube 6 must be used to connectorize a fiber optic cable that is longer than 18 feet.

Figure 2:
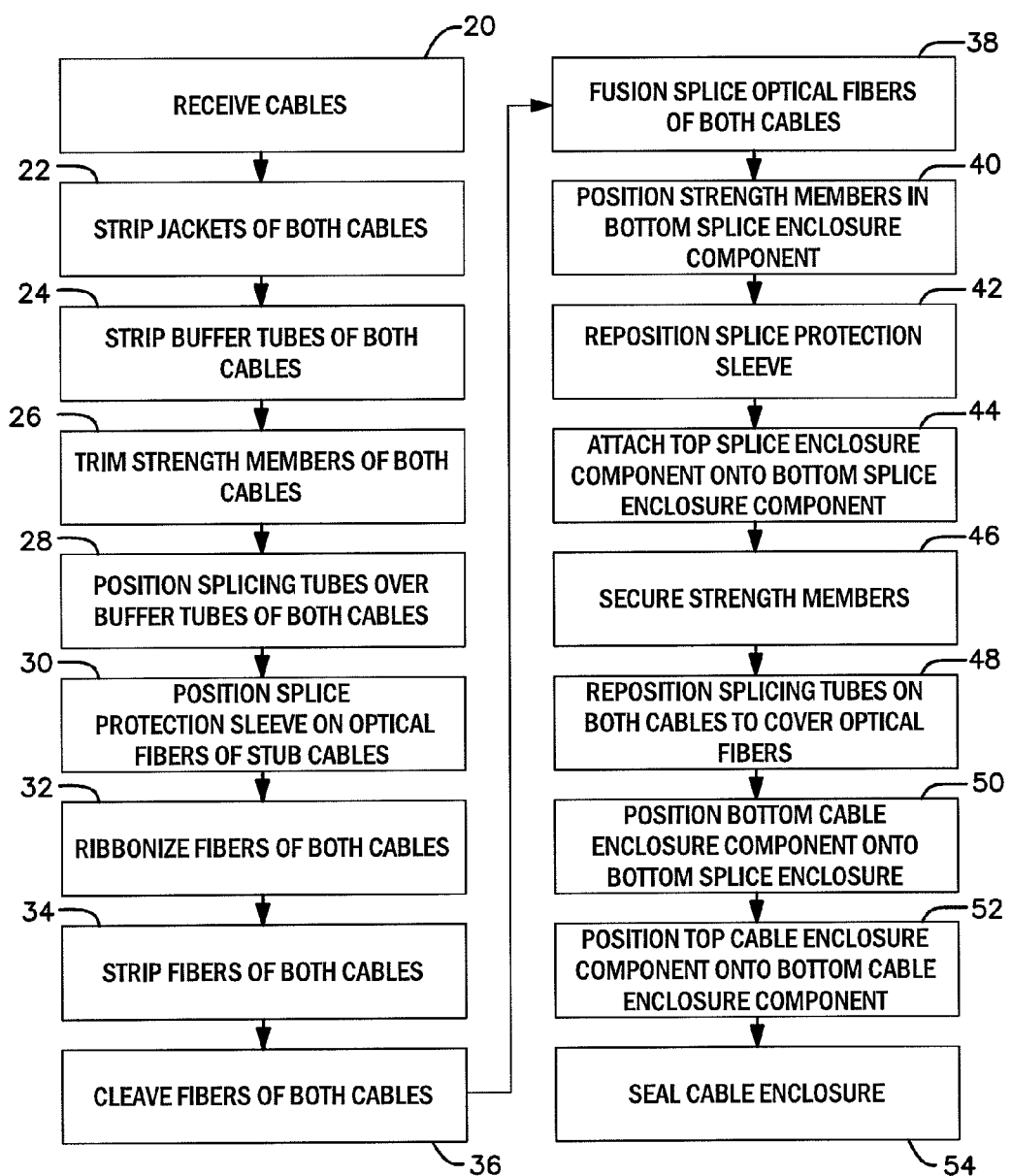
FIG. 2 is a flowchart illustrating an example operation to connectorize a fiber optic cable.

FIG. 2 is a flowchart illustrating an example operation to connectorize fiber optic cable 2. It should be appreciated that the operation illustrated in the example of FIG. 2 is provided for explanatory purposes and is not intended to represent a sole way of practicing the techniques of this disclosure. Rather, the techniques of this disclosure may be practiced in many ways.

Initially, a technician may receive two fiber optic cables (20). For purposes of explanation, this disclosure refers to one of the fiber optic cables as a "primary cable" and one of the fiber optic cables as a "stub cable." This disclosure refers to one of the cables as a "stub cable" and one of the fiber optic cables as a "primary cable" because the stub cable may be shorter in length than the primary cable. Both the primary cable and the stub cable may have the components of fiber optic cable 2 as illustrated in the example of FIG. 1.

When the technician receives the primary cable and the stub cable, the primary cable has an unconnectorized end and the stub cable has an unconnectorized end. Furthermore, when the technician receives the primary cable and the stub cable, one of the ends of the stub cable is connectorized. The stub cable may have been connectorized in a variety of ways. For instance, the stub cable may be shorter than 18 feet. In this instance, because the stub cable is shorter than 18 feet, a technician may telescopically slide the optical fibers of the stub cable within a buffer tube of the stub cable, thereby enabling a technician to attach a connector to the exposed terminal segments of the optical fibers of the stub cable. The primary cable may be longer than 18 feet. Consequently, the technician cannot telescopically slide the optical fibers of the primary cable within a buffer tube of the primary cable to attach a connector to exposed terminal segments of the optical fibers of the primary cable. As used in this disclosure, a "terminal segment" of a fiber is a segment of a fiber at one end of the fiber.

After the technician receives the two fiber optic cables (i.e., the primary cable and the stub cable), the technician may strip off a portion of the jacket of the primary cable at the unconnectorized end of the primary cable and may strip off a portion of the jacket of the stub cable at the unconnectorized end of the stub cable (22). When the technician strips off the portion of the jacket of the primary cable, terminal segments of the strength members of the primary cable and a terminal segment of the buffer tube of the primary cable may be exposed. For instance, the technician may strip off a portion of the jacket of the primary cable sufficient to expose a terminal segment of the buffer tube and terminal segments of the strength members of the primary cable that are approximately eight inches long. Similarly, when the technician strips off the portion of the jacket of the stub cable, terminal segments of the strength members of the stub cable and a terminal segment of the buffer tube of the stub cable may be exposed. The lengths of the exposed terminal segments of the strength members of the stub cable and the terminal segment of the buffer tube may have similar lengths to the exposed terminal segments of the strength members and the buffer tube of the primary cable.

Next, the technician may strip off a terminal segment of the buffer tube of the primary cable and a terminal segment of the buffer tube of the stub cable (24). When the technician strips off the terminal segment of the buffer tube of the primary cable, terminal segments of the optical fibers of the primary cable are exposed. For instance, the technician may strip off a portion of the buffer tube sufficient to expose terminal segments of the optical fibers of the primary cable that are approximately four inches long. When the technician strips off the terminal segment of the buffer tube of the stub cable, terminal segments of the optical fibers of the stub cable are exposed. For instance, the technician may strip off a portion of the buffer tube sufficient to expose terminal segments of the optical fibers of the stub cable that are approximately four inches long.

After stripping the buffer tubes of the primary cable and the stub cable, the technician may trim the terminal segments of the strength members of the primary cable and may trim the terminal segments of the strength members of the stub cable (26). As a result of trimming the terminal segments of the strength members of the primary cable, the terminal segments of the optical fibers of the primary cable may extend a short distance (e.g., ⅛ inch) beyond the ends of the terminal segments of the strength members of the primary cable. Furthermore, as a result of trimming the terminal segments of the strength members of the primary cable, the terminal segments of the optical fibers of the stub cable may extend a short distance (e.g., ⅛ inch) beyond the ends of the terminal segments of the strength members of the stub cable.

Subsequently, the technician may position a splicing tube over the remaining terminal segment of the buffer tube of the primary cable and a splicing tube over the remaining terminal segment of the buffer tube of the stub cable (28). The splicing tubes may have greater inner diameters than the outer diameters of the buffer tubes of the cables. Consequently, the technician may position a splicing tube over the remaining terminal segment of the buffer tube of the primary cable by threading the exposed terminal segments of the optical fibers of the primary cable and the remaining terminal segment of the buffer tube of the primary cable through the splicing tube. Similarly, the technician may position a splicing tube over the remaining terminal segment of the buffer tube of the stub cable by threading the exposed terminal segments of the optical fibers of the stub cable and the remaining terminal segment of the buffer tube of the stub cable through the splicing tube. Each of the splicing tubes may be approximately four inches in length. Consequently, when positioned over the remaining terminal segments of the buffer tubes, the ends of the splicing tubes disposed toward the unconnectorized ends of the cables may be approximately flush with the ends of the remaining terminal segments of the buffer tubes that are disposed toward the unconnectorized ends of the cables. The splicing tubes may be composed of a variety of different types of materials including a Teflon® fluoropolymer material, a vinyl material, a rubber material, or another type of material.

After positioning the splicing tubes over the remaining terminal segments of the buffer tubes of the cables, the technician may position a splice protection sleeve over the terminal segments of the optical fibers of the stub cable (30). The splice protection sleeve may be a tube having an inner diameter that is sufficiently wide to accommodate all of the optical fibers of the stub cable when the optical fibers of the stub cable are arranged in a flat plane relative to one another. Consequently, the technician may position the splice protection sleeve over the terminal segments of the optical fibers of the stub cable by threading the terminal segments of the optical fibers of the stub cable through the splice protection sleeve. The splice protection sleeve may be approximately one inch in length. Because the splice protection sleeve is approximately one inch in length, the exposed terminal segments of the optical fibers of the stub cable may be approximately three inches in length when the splice protection sleeve is positioned flush with the end of the buffer tube of the stub cable. It should be appreciated that the technician may alternatively position the splice protection sleeve over the terminal segments of the optical fibers of the primary cable without significantly impacting the operation.

Next, the technician may ribbonize the terminal segments of the optical fibers of the primary cable and may ribbonize the terminal segments of the optical fibers of the stub cable (32). When the technician ribbonizes the terminal segments of the optical fibers of the primary cable, the technician may use a small amount of epoxy or other material to hold the terminal segments of the optical fibers of the primary cable in a flat plane relative to one another. Similarly, when the technician ribbonizes the terminal segments of the optical fibers of the stub cable, the technician may use a small amount of epoxy or other material to hold the terminal segments of the optical fibers of the stub cable in a flat plane relative to one another.

After ribbonizing the terminal segments of the optical fibers of primary cable and the stub cable, the technician may strip off the outer coatings of the terminal segments of the optical fibers of the primary cable and may strip off the outer coatings of the terminal segments of the optical fibers of the stub cable (34). As a result of stripping off the outer coatings of the terminal segments of the optical fibers of the primary cable, the outer surface of the cladding of the terminal segments of the optical fibers of the primary cable may be exposed. Likewise, stripping off the outer coatings of the terminal segments of the optical fibers of the stub cable may result in exposure of the outer surface of the cladding of the terminal segments of the optical fibers of the stub cable.

Next, the technician may cleave the ends of the terminal segments of the optical fibers of the primary cable and may cleave the ends of the terminal segments of the optical fibers of the stub cable (36). As a result of cleaving the ends of the terminal segments of the optical fibers, the ends of the terminal segments of the optical fibers may be relatively smooth, without lips, burs, fractures, roll-offs, or other types of irregularities.

Once the technician has cleaved the ends of the terminal segments of the optical fibers of the cables, the technician may splice the ends of the terminal segments of the optical fibers of the primary cable to corresponding ends of the terminal segments of the optical fibers of the stub cable (38). For instance, the technician may place the terminal segments of the optical fibers of the cables in a fusion splicing tool that holds the terminal segments of the optical fibers of the cables such that corresponding ones of the optical fibers are aligned. The splicing tool may then emit a small spark to burn off dust and moisture in the gap between the optical fibers of the primary cable and the optical fibers of the stub cable. Next, the splicing tool may emit a larger spark that raises the temperature of the cores of the optical fibers above the melting points of the cores, thereby fusing the cores of the optical fibers of the primary cable to the cores of corresponding ones of the optical fibers of the stub cable. In other instances, the ends of the terminal segments of the optical fibers of the primary cable may be mechanically or otherwise spliced to corresponding ends of the terminal segments of the optical fibers of the stub cable.

After splicing the ends of the terminal segments of the optical fibers of the primary cable to the ends of the terminal segments of the optical fibers of the stub cable, the technician may position the terminal segments of the strength members of the primary cable and the terminal segments of the strength members of the stub cable into strength member channels of a bottom splice enclosure component (40). When the technician positions the terminal segments of the strength members of the primary cable and the terminal segments of the strength members of the stub cable into the strength member channels of the bottom splice enclosure component, the fused optical fibers may be positioned within a central channel of the bottom splice enclosure component.

Figure 3:
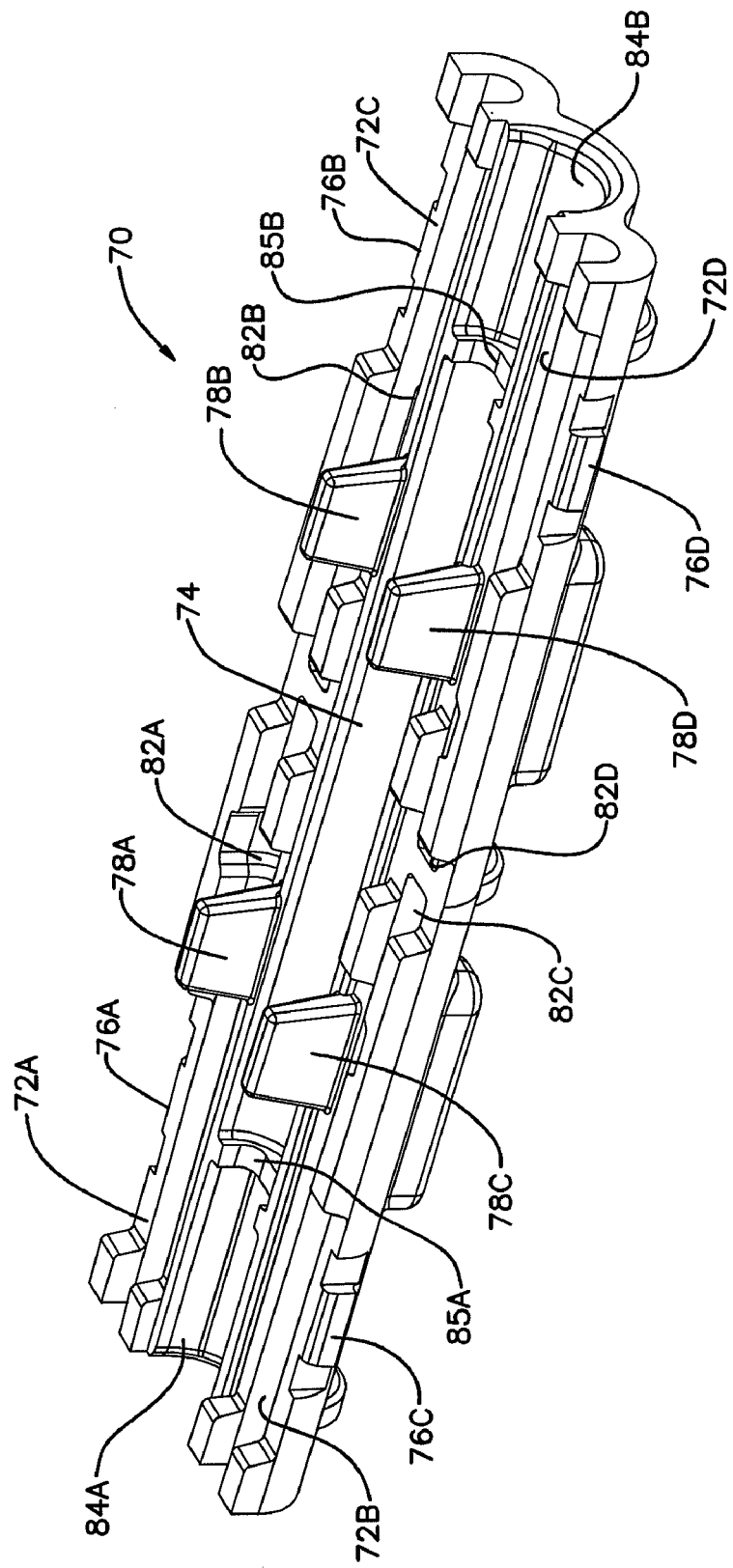
FIG. 3 is a view of an inner side of an example bottom splice enclosure component.
Figure 4:
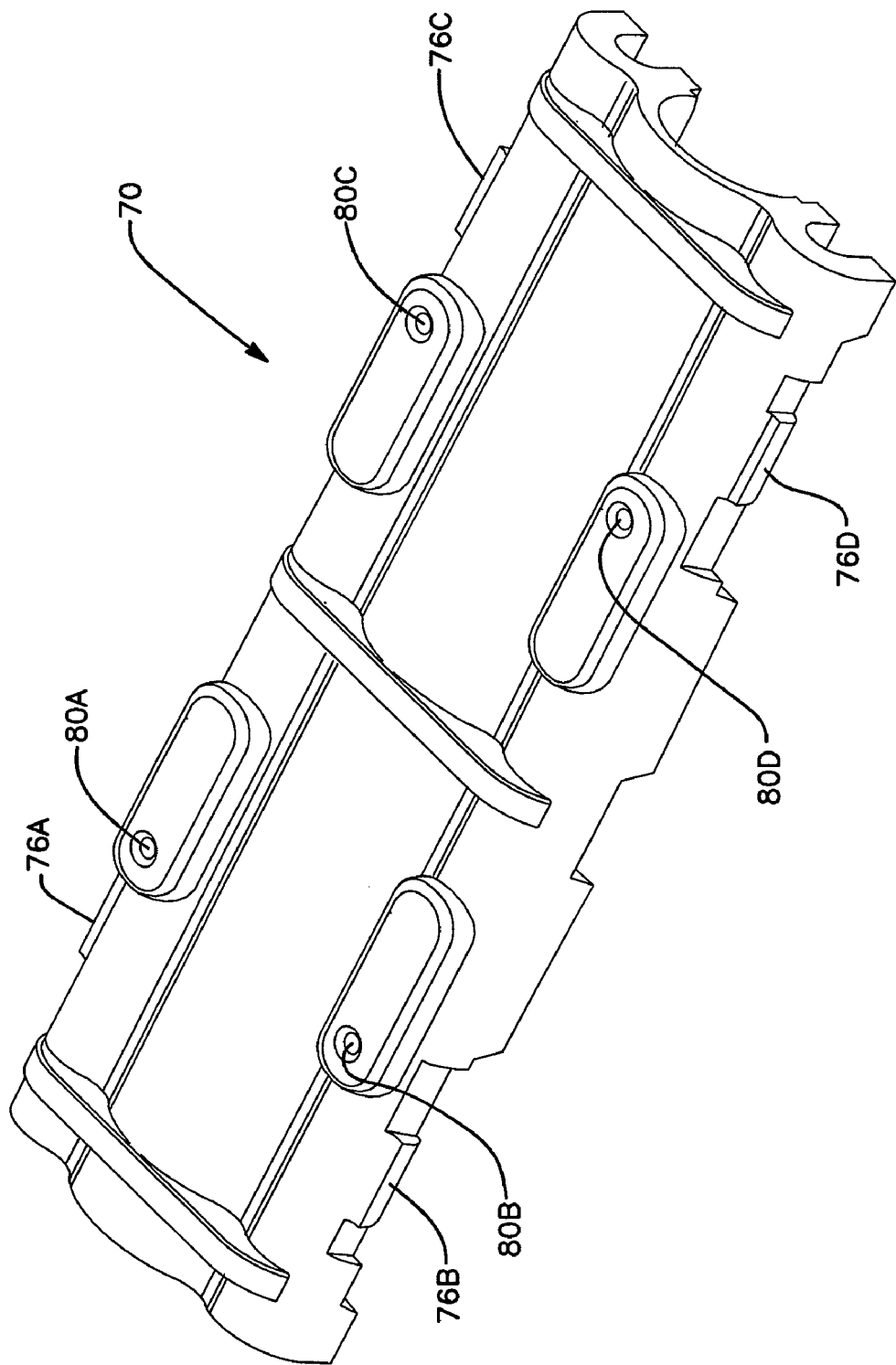
FIG. 4 is a view of an outer side of the example bottom splice enclosure component.

FIG. 3 is a view of an inner side of an example bottom splice enclosure component 70. FIG. 4 is a view of an outer side of bottom splice enclosure component 70. In the examples of FIG. 3 and FIG. 4, bottom splice enclosure component may be approximately 1.5 inches in length, 0.5 inches wide, and 0.25 inches thick. As illustrated in the example of FIG. 3, bottom splice enclosure component 70 includes a strength member channel 72A, a strength member channel 72B, a strength member channel 72C, and a strength member channel 72D. This disclosure may refer to strength member channel 72A, strength member channel 72B, strength member channel 72C, and strength member channel 72D collectively as "strength member channels 72." Strength member channels 72 may be semi-circular channels having diameters slightly larger than the outer diameters of the strength members of the primary cable and the strength members of the stub cable. When the technician positions the terminal segments of the strength members of the primary cable in the strength member channels of bottom splice enclosure component 70, the terminal segment of a first strength member of the primary cable may be positioned in strength member channel 72A and the terminal segment of a second strength member of the primary cable may be positioned in strength member channel 72B. When the technician positions the terminal segments of the strength members of the stub cable in the strength member channels of bottom splice enclosure component 70, the terminal segment of a first strength member of the stub cable may be positioned in strength member channel 72C and the terminal segment of a second strength member of the stub cable may be positioned in strength member channel 72D.

After the technician positions the terminal segments of the strength members of the cables in the strength member channels of the bottom splice enclosure component, the technician may reposition the splice protection sleeve into a splice protection sleeve channel of the bottom splice enclosure component (42). In the example of FIG. 3, bottom splice enclosure component 70 includes a splice protection sleeve channel 74. Splice protection sleeve channel 74 may be a semi-circular channel that has a diameter that is slightly larger than the outer diameter of the splice protection sleeve. When the splice protection sleeve is positioned into the splice protection sleeve channel, the splice protection sleeve covers the fused ends of the optical fibers of the primary cable and the stub cable. In this way, the splice protection sleeve protects the fused ends of the optical fibers from damage due to contact with the bottom splice enclosure component.

Next, the technician may position a top splice enclosure component onto the bottom splice enclosure component (44). When the top splice enclosure component is positioned onto the bottom splice enclosure component, this disclosure may refer to the top splice enclosure component and the bottom splice enclosure component collectively as the "splice enclosure." In other words, positioning the top splice enclosure component onto the bottom splice enclosure component forms a splice enclosure.

Figure 5:
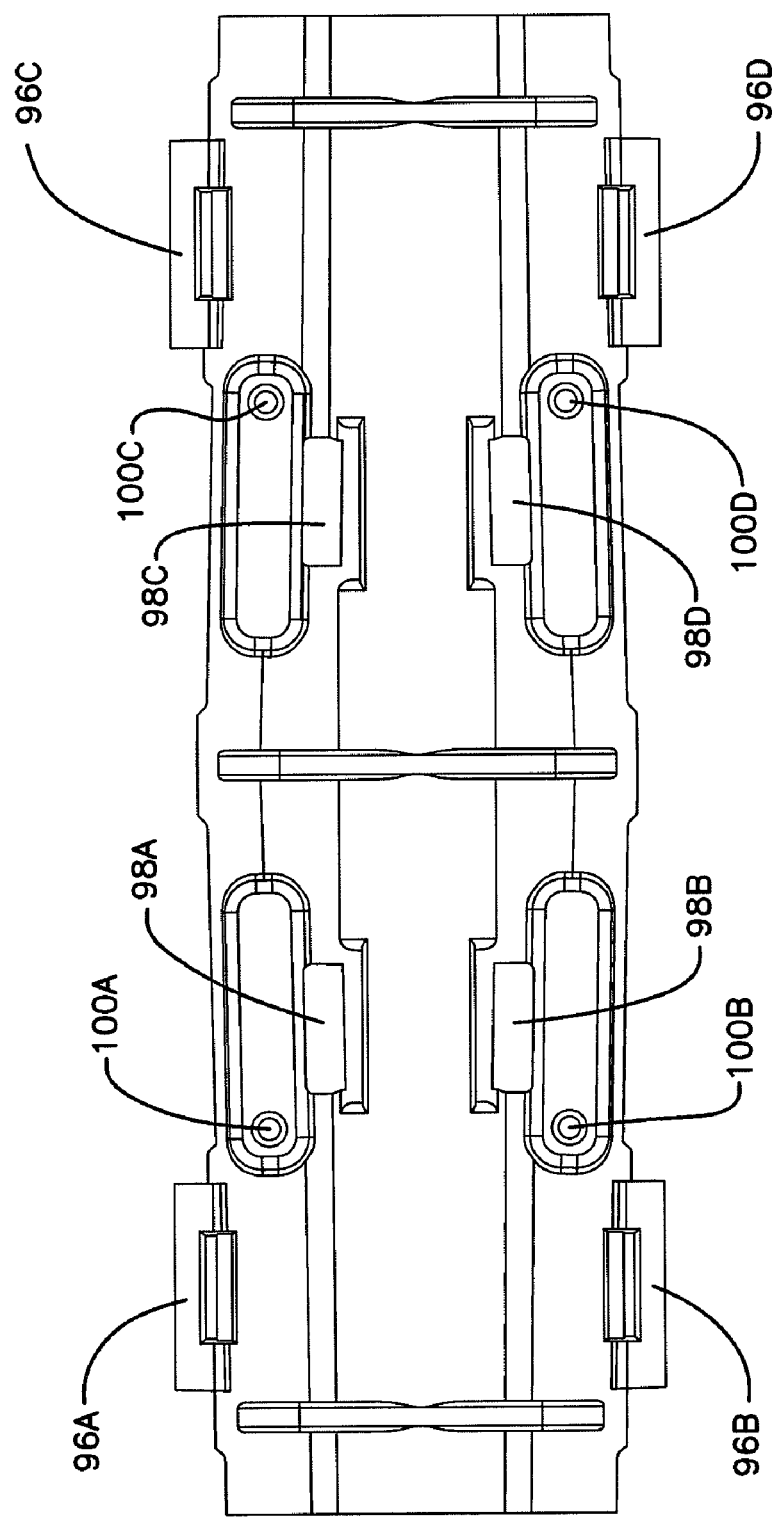
FIG. 5 is a view of an outer side of an example top splice enclosure component.
Figure 6:
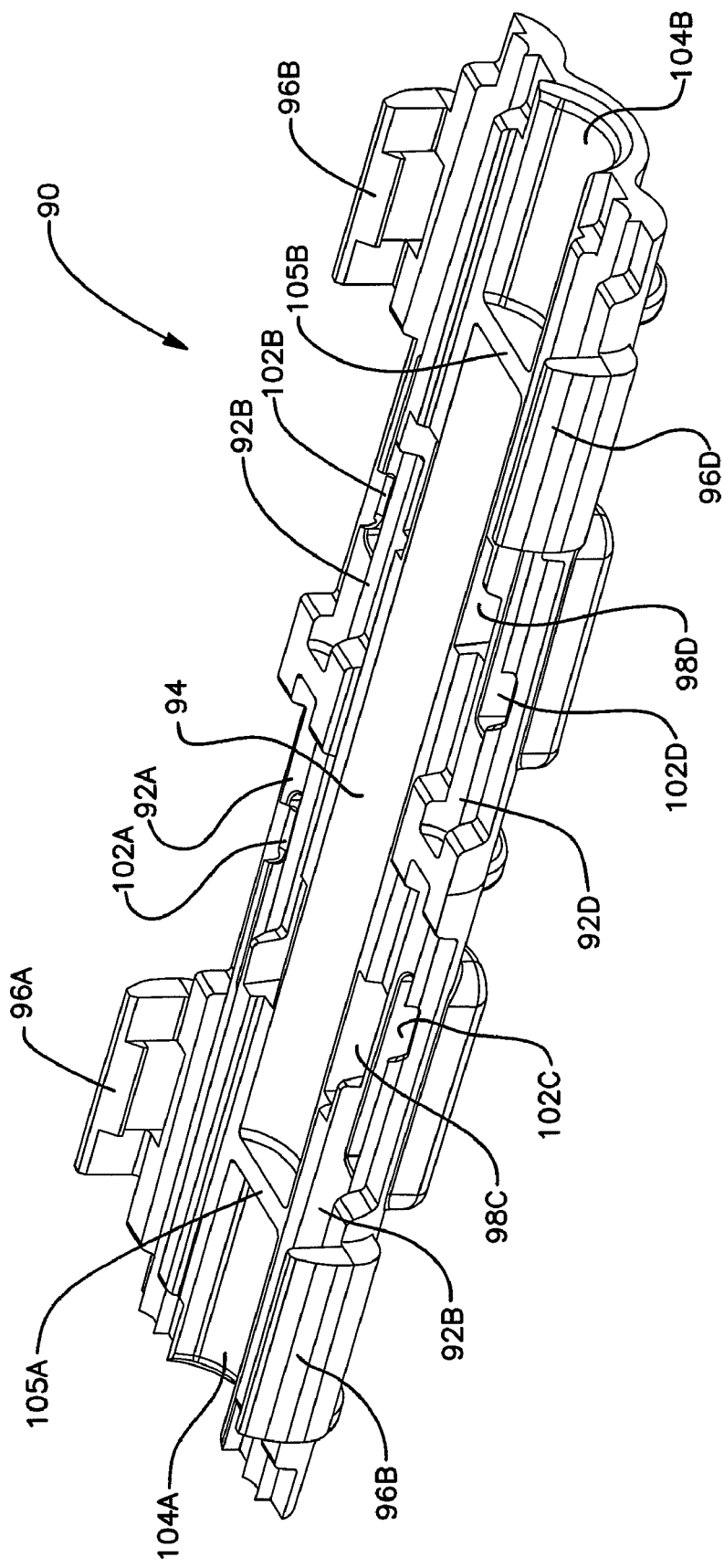
FIG. 6 is a view of an inner side of the example top splice enclosure component.

FIG. 5 is a view of an outer side of an example top splice enclosure component 90. FIG. 6 is a view of an inner side of top splice enclosure component 90. As illustrated in the example of FIG. 6, top splice enclosure component 90 may include a strength member channel 92A, a strength member channel 92B, a strength member channel 92C, and a strength member channel 92D. This disclosure refers to strength member channel 92A, strength member channel 92B, strength member channel 92C, and strength member channel 92D collectively as "strength member channels 92." When the technician positions top splice enclosure component 90 onto bottom splice enclosure component 70, the top portions of the terminal segments of the strength members of the primary cable may be disposed within strength member channel 92A and strength member channel 92B. Furthermore, when the technician attaches top splice enclosure component 90 onto bottom splice enclosure component 70, the top portions of the terminal segments of the strength members of the stub cable may be disposed within strength member channel 92C and strength member channel 92D. Top splice enclosure component 90 also includes a splice protection sleeve channel 94. When the technician positions top splice enclosure component 90 onto bottom splice enclosure component 70, the top portion of the splice enclosure sleeve may be disposed within splice protection sleeve channel 94.

As illustrated in the examples of FIG. 5 and FIG. 6, top splice enclosure component 90 includes an attachment flange 96A, an attachment flange 96B, an attachment flange 96C, and an attachment flange 96D. This disclosure refers to attachment flange 96A, attachment flange 96B, attachment flange 96C, and attachment flange 96D collectively as "attachment flanges 96." Furthermore, as illustrated in the examples of FIG. 3 and FIG. 4, bottom splice enclosure component 70 includes an attachment ridge 76A, an attachment ridge 76B, an attachment ridge 76C, and an attachment ridge 76D. This disclosure refers to attachment ridge 76A, attachment ridge 76B, attachment ridge 76C, and attachment ridge 76D collectively as "attachment ridges 76." Each of attachment flanges 96 on top splice enclosure component 90 includes an angled lip that snaps over a corresponding one of attachment ridges 76 on bottom splice enclosure component 70. For instance, the lip on attachment flange 96A may snap over attachment ridge 76A, the lip on attachment flange 96B may snap over attachment ridge 76B, the lip on attachment flange 96C may snap over attachment ridge 76C, and the lip on attachment flange 96D may snap over attachment ridge 76D. In this way, attachment flanges 96 and attachment ridges 76 serve to securely attach top splice enclosure component 70 to bottom splice enclosure component 90.

Furthermore, as illustrated in the example of FIG. 3, bottom splice enclosure component 70 may include an attachment fin 78A, an attachment fin 78B, an attachment fin 78C, and an attachment fin 78D. This disclosure refers to attachment fin 78A, attachment fin 78B, attachment fin 78C, and attachment fin 78D collectively as "attachment fins 78." Attachment fins 78 are ridge-like bumps extending vertically from bottom splice enclosure component 70. In the example of FIG. 3, attachment fins 78 are disposed between strength member channels 72 and splice protection sleeve channel 74. As illustrated in the examples of FIG. 5 and FIG. 6, top splice enclosure component 90 includes an attachment aperture 98A, an attachment aperture 98B, an attachment aperture 98C, and an attachment aperture 98D. This disclosure refers to attachment aperture 98A, attachment aperture 98B, attachment aperture 98C, and attachment aperture 98D collectively as "attachment apertures 98." Attachment apertures 98 are apertures through top splice enclosure component 90 that are shaped and positioned to accommodate corresponding ones of attachment fins 78 when top splice enclosure component 90 is positioned onto bottom splice enclosure component 70. Consequently, when the technician has positioned top splice enclosure component 90 onto bottom splice enclosure component 70, attachment fins 78 of bottom splice enclosure component 70 are disposed within attachment apertures 98 of top splice enclosure component 90. Because attachment fins 78 of bottom splice enclosure component 70 are disposed within attachment apertures 98 of top splice enclosure component 90, bottom splice enclosure component 70 may not be able to slide in a lengthwise direction relative to top splice enclosure component 90 when top splice enclosure component 90 is positioned onto bottom splice enclosure component 70. Furthermore, attachment fines 78 provide for lateral alignment of bottom splice enclosure component 70 and top splice enclosure component 90.

Figure 7:
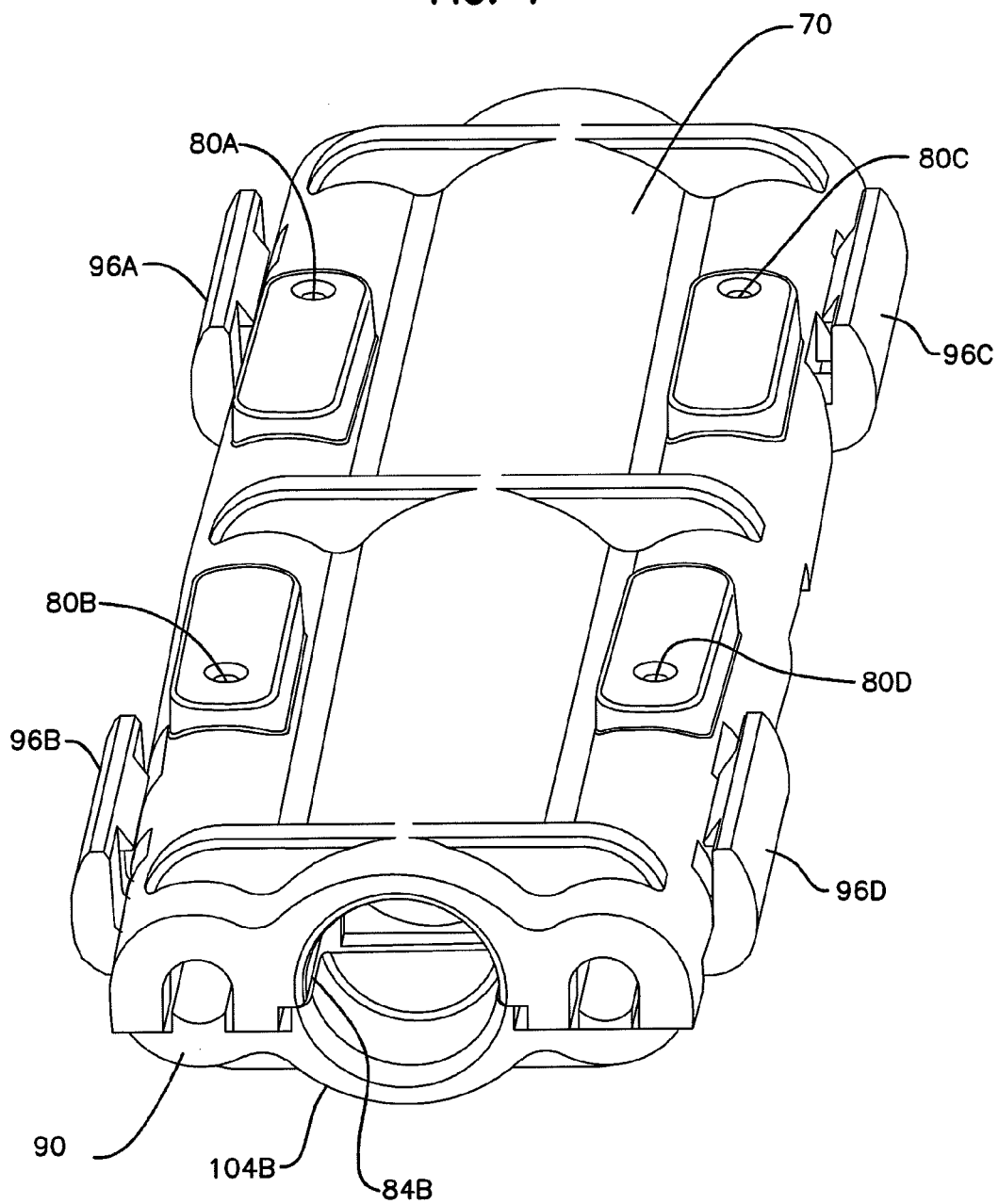
FIG. 7 is a bottom view of the example top splice enclosure component and the example bottom splice enclosure component when the top splice enclosure component is positioned onto the bottom splice enclosure component.
Figure 8:
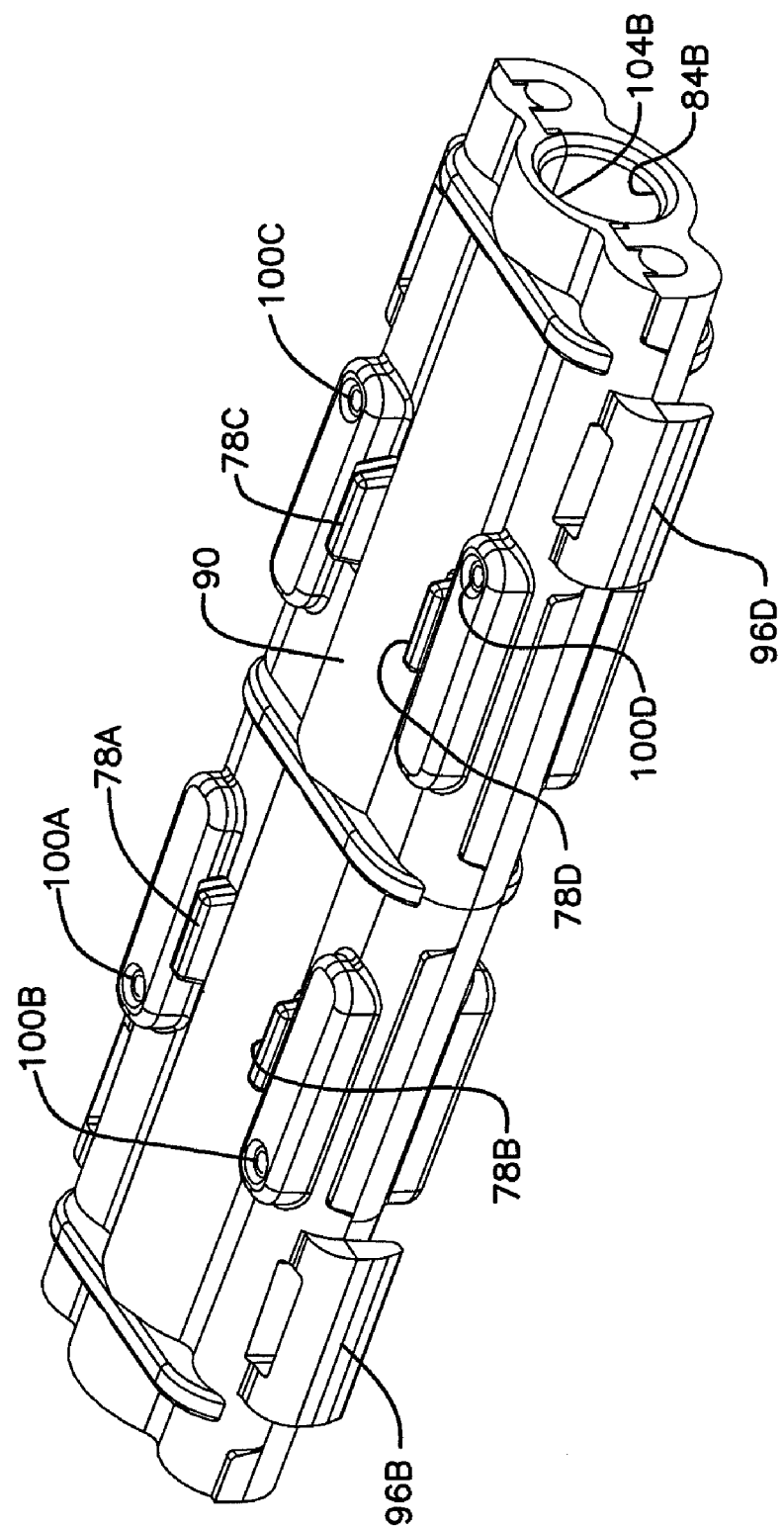
FIG. 8 is a top view of the example top splice enclosure component and the example bottom splice enclosure component when the top splice enclosure component is positioned onto the bottom splice enclosure component.

FIG. 7 is a bottom view of top splice enclosure component 90 and bottom splice enclosure component 70 when top splice enclosure component 90 is attached to bottom splice enclosure component 70. In other words, FIG. 7 is a bottom view of a splice enclosure. FIG. 8 is a top view of top splice enclosure component 90 and bottom splice enclosure component 70 when top splice enclosure component 90 is attached to bottom splice enclosure component 70. In other words, FIG. 8 is a top view of a splice enclosure. As can be seen in the example of FIG. 8, attachment fins 78 extend through attachment apertures 98.

After the technician attaches the top splice enclosure component 70 to bottom splice enclosure component 90, the technician may secure the terminal segments of the strength members of the primary cable and the terminal segments of the strength members of the stub cable within the splice enclosure (46). The technician may secure the terminal segments of the strength members of the primary cable and the terminal segments of the strength members of the stub cable within the splice enclosure in a variety of ways. For example, the technician may crimp the terminal segments of the strength members of the primary cable and the terminal segments of the strength members of the stub cable within the splice enclosure.

In an alternative example illustrated in the examples of FIG. 4 and FIG. 7, bottom splice enclosure component 70 may include an epoxy injection aperture 80A, an epoxy injection aperture 80B, an epoxy injection aperture 80C, and an epoxy injection aperture 80D. This disclosure may refer to epoxy injection aperture 80A, epoxy injection aperture 80B, epoxy injection aperture 80C, and epoxy injection aperture 80D collectively as "epoxy injection apertures 80." Furthermore, as illustrated in the example of FIG. 3, bottom splice enclosure component 70 may include an epoxy retention cavity 82A, an epoxy retention cavity 82B, an epoxy retention cavity 82C, and an epoxy retention cavity 82D. This disclosure may refer to epoxy retention cavity 82A, epoxy retention cavity 82B, epoxy retention cavity 82C, and epoxy retention cavity 82D collectively as "epoxy retention cavities 82." Each of epoxy retention cavities 82 is a cavity within one of strength member channels 72 of bottom splice enclosure component 70. Epoxy injection apertures 80 are apertures through bottom splice enclosure component 70 from an outer side of bottom splice enclosure component 70 to corresponding epoxy retention cavities 82 on the inner side of bottom splice enclosure component 70. For instance, epoxy injection aperture 80A may be an aperture through bottom splice enclosure component 70 from the outer side of bottom splice enclosure component 70 to epoxy retention cavity 82A, epoxy injection aperture 80B may be an aperture through bottom splice enclosure component 70 from the outer side of bottom splice enclosure component 70 to epoxy retention cavity 82B, and so on.

Furthermore, as illustrated in the examples of FIG. 5, FIG. 6, and FIG. 8, bottom splice enclosure component 90 may include an epoxy injection aperture 100A, an epoxy injection aperture 100B, an epoxy injection aperture 100C, and an epoxy injection aperture 100D. This disclosure may refer to epoxy injection aperture 100A, epoxy injection aperture 100B, epoxy injection aperture 100C, and epoxy injection aperture 100D collectively as "epoxy injection apertures 100." Furthermore, top splice enclosure component 90 may include an epoxy retention cavity 102A, an epoxy retention cavity 102B, an epoxy retention cavity 102C, and an epoxy retention cavity 102D. This disclosure may refer to epoxy retention cavity 102A, epoxy retention cavity 102B, epoxy retention cavity 102C, and epoxy retention cavity 102D collectively as "epoxy retention cavities 102." Each of epoxy retention cavities 102 is a cavity within one of strength member channels 92 of top splice enclosure component 90. Epoxy injection apertures 100 are apertures through top splice enclosure component 90 from an outer side of top splice enclosure component 90 to corresponding ones of epoxy retention cavities 102 on the inner side of top splice enclosure component 90. For instance, epoxy injection aperture 100A may be an aperture through top splice enclosure component 90 from the outer side of top splice enclosure component 90 to epoxy retention cavity 102A, epoxy injection aperture 100B may be an aperture through top splice enclosure component 90 from the outer side of top splice enclosure component 90 to epoxy retention cavity 102B, and so on.

When the technician secures the terminal segments of the strength members of the primary cable and the terminal segments of the strength members of the stub cable within the splice enclosure formed by top splice enclosure component 90 and bottom splice enclosure component 70, the technician may inject epoxy through epoxy injection apertures 80 and epoxy injection apertures 100. When the technician injects the epoxy through epoxy injection apertures 80, the epoxy may fill epoxy retention cavities 92. When the technician injects the epoxy through epoxy injection apertures 100, the epoxy may fill epoxy retention cavities 102. Because the epoxy fills epoxy retention cavities 92 and epoxy retention cavities 102, the epoxy is in contact with the terminal segments of the strength members of the primary cable, the terminal segments of the strength members of the stub cable, top splice enclosure component 90, and bottom splice enclosure component 70. After the epoxy fills epoxy retention cavities 92 and epoxy retention cavities 102, the technician may heat cure the epoxy. In this way, the technician may secure the terminal segments of the strength members of the primary cable and the terminal segments of the strength members of the stub cable within the splice enclosure formed by top splice enclosure component 90 and bottom splice enclosure component 70.

After the technician secures the terminal segments of the primary cable and the terminal segments of the stub cable within the splice enclosure, the technician may reposition the splicing tube on the primary cable to cover the segments of the optical fibers of the primary cable that are not covered by the buffer tube of the primary cable or the splice enclosure and may reposition the splicing tube on the stub cable to cover the segments of the optical fibers of the stub cable that are not covered by the buffer tube of the stub cable or the splice enclosure (48). By repositioning the splicing tubes in this manner, substantially all exposed segments of the optical fibers of the primary cable and substantially all exposed segments of the optical fibers of the stub cable may be covered by buffer tubes, splicing tubes, or the splice protection sleeve.

As illustrated in the examples of FIG. 3, FIG. 7, and FIG. 8, bottom splice enclosure component 70 may be shaped to define a splicing tube collar 84A and a splicing tube collar 84B. Bottom splice enclosure component 70 is also shaped to define a partial wall 85A between splicing tube collar 84A and splice protection sleeve channel 74. Partial wall 85A maintains separation between the splice protection sleeve and the buffer tube of the primary cable. Bottom splice enclosure component 70 is also shaped to define a partial wall 85B between splicing tube collar 84B and splice protection sleeve channel 74. Partial wall 85B maintains separation between the splice protection sleeve and the buffer tube of the stub cable. Partial wall 85A and partial wall 85B are notched to allow the optical fibers of the primary cable and the stub cable to pass into splice protection sleeve channel 74.

As illustrated in the examples of FIG. 6, FIG. 7, and FIG. 8, top splice enclosure component 90 may be shaped to define a splicing tube collar 104A and a splicing tube collar 104B. Top splice enclosure component 90 is also shaped to define a wall 105A between splicing tube collar 104A and splice protection sleeve channel 94. Wall 105A maintains separation between the splice protection sleeve and the buffer tube of the primary cable. Top splice enclosure component 90 is also shaped to define a wall 105B between splicing tube collar 104B and splice protection sleeve channel 94. Wall 105B maintains separation between the splice protection sleeve and the buffer tube of the stub cable.

When top splice enclosure component 90 is positioned onto bottom splice enclosure component 70, splicing tube collar 84A and splicing tube collar 104A form a first splicing tube ring and splicing tube collar 84B and splicing tube collar 104B form a second splicing tube ring. The inner diameters of the first splicing tube ring and the second splicing tube rings may be slightly smaller than the outer diameters of the splicing tubes. When the technician repositions the splicing tubes, an end of a first one of the splicing tubes may be disposed within the first splicing tube ring and an end of a second one of the splicing tubes may be disposed within the second splicing tube ring. Because the end of the first one of the splicing tubes is disposed within the first splicing tube ring and because the inner diameter of the first splicing tube ring is slightly smaller than the outer diameter of the first one of the splicing tubes, the resulting compression may generate friction that inhibits the first one of the splicing tubes from moving relative to top splice enclosure component 90 and bottom splice enclosure component 70. Similarly, because the end of the second one of the splicing tubes is disposed within the second splicing tube ring and because the inner diameter of the second splicing tube ring is slightly smaller than the outer diameter of the second one of the splicing tubes, the resulting compression may generate friction that inhibits the second one of the splicing tubes from moving relative to top splice enclosure component 90 and bottom splice enclosure component 70.

Figure 9:
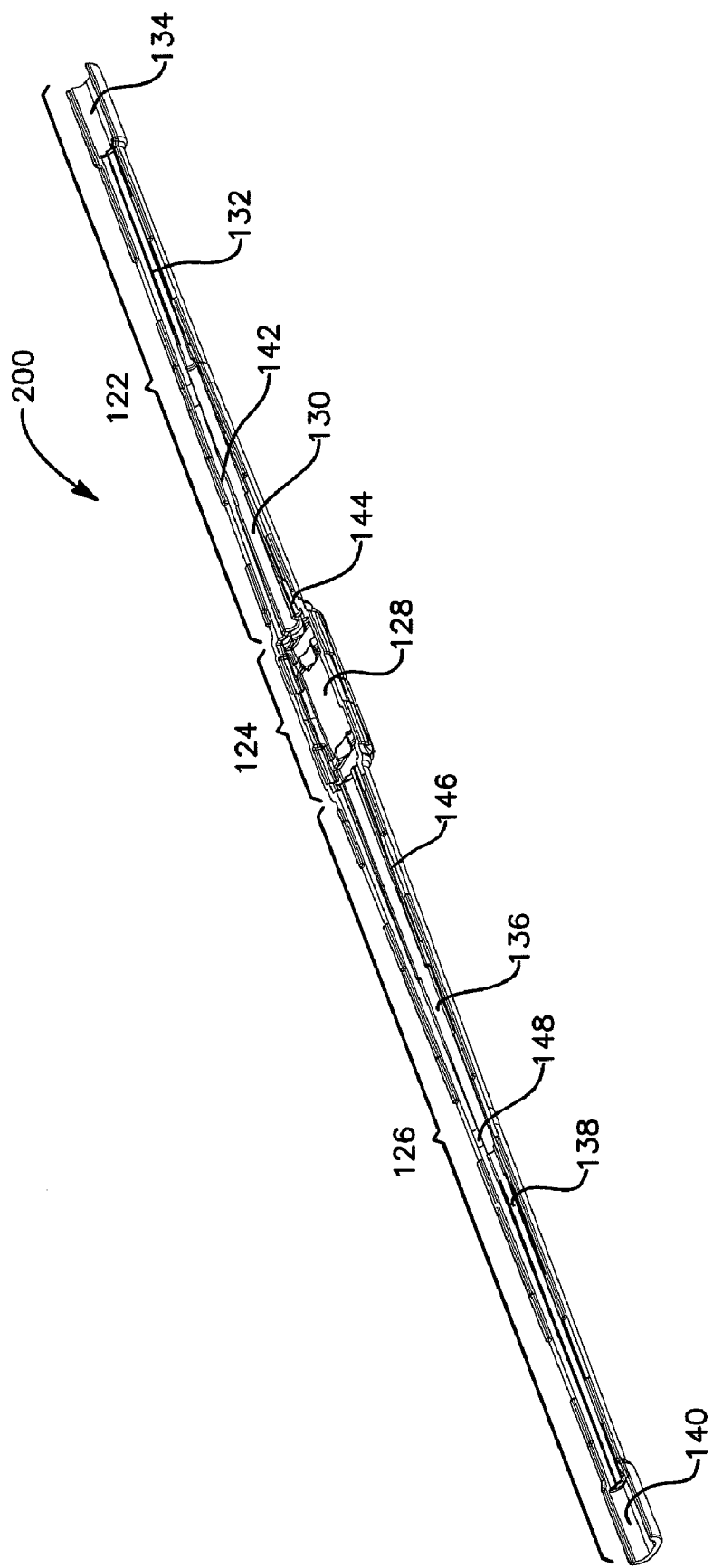
FIG. 9 is an illustration of an inner side of an example bottom cable enclosure component.

After the technician repositions the splicing tubes, the technician may position a bottom cable enclosure component onto the bottom splice enclosure component (50). FIG. 9 is an illustration of an inner side of an example bottom cable enclosure component 120. Bottom cable enclosure component 120 may be composed of a variety of rigid or flexible materials. For instance, cable enclosure component 120 may be composed of a single piece of a flexible rubber-like material. In other instances, cable enclosure component 120 may be composed of plastic, metal, ceramic, or another type of material.

As illustrated in the example of FIG. 9, bottom cable enclosure component 120 is shaped to include a primary arm 122, a splice enclosure retention region 124, and a stub arm 126. Primary arm 122 is connected to one edge of splice enclosure retention region 124 and stub arm 126 is connected to an opposite edge of splice enclosure retention region. Primary arm 122 and stub arm 126 may have similar or different lengths as appropriate.

Splice enclosure retention region 124 is shaped to form a recess 128 that is generally rectangular in shape and sized to simultaneously receive the bottom splice enclosure component 70 and the top splice enclosure component 90. Recess 128 has a depth that is approximately equal to the greatest vertical depth of bottom splice enclosure component 70. Furthermore, recess 128 has a width that is slightly wider than the widest portion of bottom splice enclosure component 70. In addition, recess 128 has a length that is slightly longer than the longest portion of bottom splice enclosure component 70. When the technician positions bottom cable enclosure component 120 onto bottom splice enclosure component 70, bottom splice enclosure component 70 may rest snugly within recess 128.

Primary arm 122 is shaped to form a semi-circular splicing tube channel 130 that extends outwardly from the interface between primary arm 122 and splice enclosure retention region 124. The inner diameter of splicing tube channel 130 is slightly larger than the outer diameter of the splicing tube that covers the optical fibers of the primary cable. Splicing tube channel 130 may be approximately as long as the exposed portion of the splicing tube that covers the optical fibers of the primary cable after the splicing tube has been repositioned into the splicing tube ring defined by splicing tube collar 84A and splicing tube collar 104A. When the technician positions bottom cable enclosure component 120 onto bottom splice enclosure component 70, the splicing tube that covers the optical fibers of the primary cable may rest within splicing tube channel 130.

Primary arm 122 is also shaped to form a semi-circular buffer tube channel 132 that extends outwardly away from splice enclosure retention region 124 starting at an outward end of splicing tube channel 130. The inner diameter of buffer tube channel 132 is slightly larger than the outer diameter of the buffer tube of the primary cable. Buffer tube channel 132 may be approximately as long as the exposed terminal segment of the buffer tube of the primary cable. When the technician positions bottom cable enclosure component 120 onto bottom splice enclosure component 70, the exposed terminal segment of the buffer tube of the primary cable may rest within buffer tube channel 132.

In addition, primary arm 122 is shaped to form a jacket channel 134 that extends outwardly away from splice enclosure retention region 124 starting at an outward end of buffer tube channel 132. Jacket channel 134 may have a width that is slightly wider than the width of the jacket of the primary cable and may have a depth that is slightly deeper than one half of the vertical height of the jacket of the primary cable. Jacket channel 134 may have a length of approximately three quarters of an inch. When the technician positions bottom cable enclosure component 120 onto bottom splice enclosure component 70, the exposed terminal segment of the jacket of the primary cable may rest within jacket channel 134.

Primary arm 122 is also shaped to form a strength member channel 142 and a strength member channel 144 that extend outwardly away from splice enclosure retention region 124 starting at splice enclosure retention region 124 and ending at the start of jacket channel 134. Strength member channel 142 and strength member channel 144 may have widths that are slightly wider than the widths of the strength members of the primary cable. When the technician positions bottom cable enclosure component 120 onto bottom splice enclosure component 70, the exposed terminal segments of a first one of the strength members of the primary cable may rest within strength member channel 142 and a second one of the strength members of the primary cable may rest within strength member channel 144.

Stub arm 124 may have a shape that is similar to the shape of primary arm 122. For instance, stub arm 124 may be shaped to form a splicing tube channel 136 that has a shape that is similar to the shape of splicing tube channel 130, a buffer tube channel 138 that has a shape that is similar to the shape of buffer tube channel 132, a jacket channel 140 is has a shape that is similar to the shape of jacket channel 134, a strength member channel 146 that has a shape that is similar to the shape of strength member channel 142, and a strength member channel 148 that has a shape that is similar to the shape of strength member channel 144. When the technician positions bottom cable enclosure component 120 onto bottom splice enclosure component 70, the splicing tube that covers the optical fibers of the stub cable may rest within splicing tube channel 136. Furthermore, when the technician positions bottom cable enclosure component 120 onto bottom splice enclosure component 70, the exposed terminal segment of the buffer tube of the stub cable may rest within buffer tube channel 138. In addition, when the technician positions bottom cable enclosure component 120 onto bottom splice enclosure component 70, the exposed terminal segment of the jacket of the stub cable may rest within jacket channel 140. When the technician positions bottom cable enclosure component 120 onto bottom splice enclosure component 70, the exposed terminal segment of a first one of the strength members of the stub cable may rest within strength member channel 146 and the exposed terminal segment of a second one of the strength members of the stub cable may rest within strength member channel 148.

After the technician positions the bottom cable enclosure component onto the bottom splice enclosure component, the technician may position a top cable enclosure component onto the bottom cable enclosure component (52). When the top cable enclosure component is positioned on the bottom cable enclosure component, this disclosure may refer to the top cable enclosure component and the bottom cable enclosure component as the "cable enclosure." In other words, positioning the top cable enclosure component onto the bottom cable enclosure component forms a cable enclosure.

Figure 10:
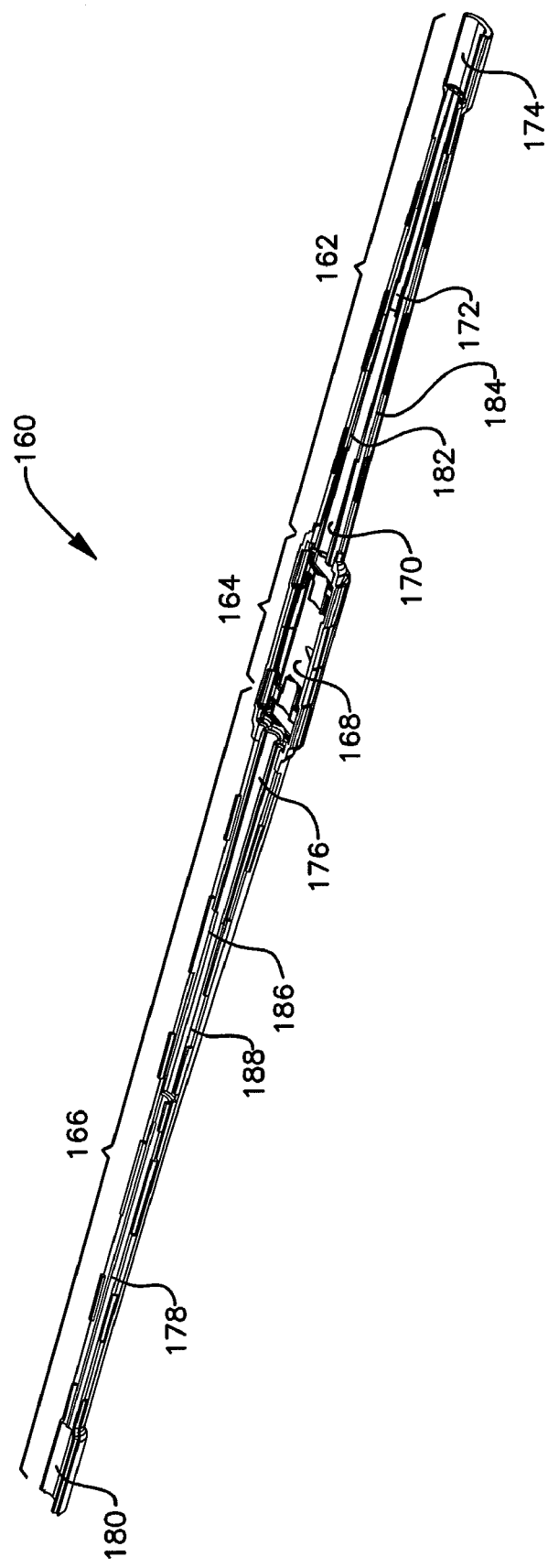
FIG. 10 is an illustration of an inner side of an example top cable enclosure component.

FIG. 10 is an illustration of an inner side of an example top cable enclosure component 160. Top cable enclosure component 160 may be composed of materials that are similar or different than the materials of which bottom cable enclosure component 120 is composed. Furthermore, top cable enclosure component 160 may have a shape that is similar to the shape of bottom cable enclosure component, as described above. For instance, top cable enclosure component 160 may be shaped such that top cable enclosure component 160 has a primary arm 162, a splice enclosure retention region 164, and a stub arm 166.

Splice enclosure retention region 164 is shaped to form a recess 168 that is generally rectangular in shape. Recess 168 has a depth that is approximately equal to the greatest vertical depth of top splice enclosure component 90. Furthermore, recess 168 has a width that is slightly wider than the widest portion of top splice enclosure component 90. In addition, recess 168 has a length that is slightly longer than the longest portion of top splice enclosure component 90. When the technician positions top cable enclosure component 160 onto bottom cable enclosure component 120, top splice enclosure component 90 may rest snugly within recess 168.

Primary arm 162 may have a shape that is similar to the shape of primary arm 122 and stub arm 164 may have a shape that is similar to the shape of stub arm 124. For instance, primary arm 164 may be shaped to form a splicing tube channel 170 that has a shape that is similar to the shape of splicing tube channel 130, a buffer tube channel 172 that has a shape that is similar to the shape of buffer tube channel 132, a jacket channel 174 that has a shape that is similar to the shape of jacket channel 134, a strength member channel 182 that has a shape that is similar to the shape of strength member channel 142, and a strength member channel 184 that has a shape that is similar to the shape of strength member channel 144. When the technician positions top cable enclosure component 160 onto bottom cable enclosure component 120, the splicing tube that covers the optical fibers of the primary cable may rest within splicing tube channel 170. Furthermore, when the technician positions top cable enclosure component 160 onto bottom cable enclosure component 120, the exposed terminal segment of the buffer tube of the primary cable may rest within buffer tube channel 172. In addition, when the technician positions top cable enclosure component 160 onto bottom cable enclosure component 120, the exposed terminal segment of the jacket of the primary cable may rest within jacket channel 174. When the technician positions top cable enclosure component 160 onto bottom cable enclosure component 120, the exposed terminal segment of a first one of the strength members of the primary cable may rest within strength member channel 182 and the exposed terminal segment of a second one of the strength members of the primary cable may rest within strength member channel 184.

Furthermore, stub arm 166 of top cable enclosure component 160 may be shaped to form a splicing tube channel 176 that has a shape that is similar to the shape of splicing tube channel 136, a buffer tube channel 178 that has a shape that is similar to the shape of buffer tube channel 138, a jacket channel 180 that has a shape that is similar to the shape of jacket channel 140, a strength member channel 186 that has a shape that is similar to the shape of strength member channel 146, and a strength member channel 188 that has a shape that is similar to the shape of strength member channel 148. When the technician positions top cable enclosure component 160 onto bottom cable enclosure component 120, the splicing tube that covers the optical fibers of the stub cable may rest within splicing tube channel 176. Furthermore, when the technician positions top cable enclosure component 160 onto bottom cable enclosure component 120, the exposed terminal segment of the buffer tube of the stub cable may rest within buffer tube channel 178. In addition, when the technician positions top cable enclosure component 190 onto bottom cable enclosure component 120, the exposed terminal segment of the jacket of the stub cable may rest within jacket channel 180. When the technician positions top cable enclosure component 160 onto bottom cable enclosure component 120, the exposed terminal segment of a first one of the strength members of the stub cable may rest within strength member channel 182 and the exposed terminal segment of a second one of the strength members of the stub cable may rest within strength member channel 184.

After the technician positions the top cable enclosure component onto the bottom cable enclosure component, the technician may seal the top cable enclosure component and the bottom cable enclosure component together (54). The technician may seal the top cable enclosure component and the bottom cable enclosure component together in a variety of ways. For example, the technician may slide a heat shrink tube over the top cable enclosure component and the bottom cable enclosure component. In this example, the ends of the heat shrink tube may extend approximately two inches beyond both ends of the top cable enclosure component and the bottom cable enclosure component. Furthermore, in this example, the technician may then apply heat to the heat shrink tube, causing the heat shrink tube to shrink. When the heat shrink tube shrinks, the heat shrink tube forms a tight seal over the top cable enclosure component and the bottom cable enclosure component. In this way, the heat shrink tube protects the interface between the primary cable and the stub cable from environmental damage. In other examples, the technician may use a heat shrink wrap, an overmold, or another sealing technique to seal the top cable enclosure component and the bottom cable enclosure component together.

Figure 11:
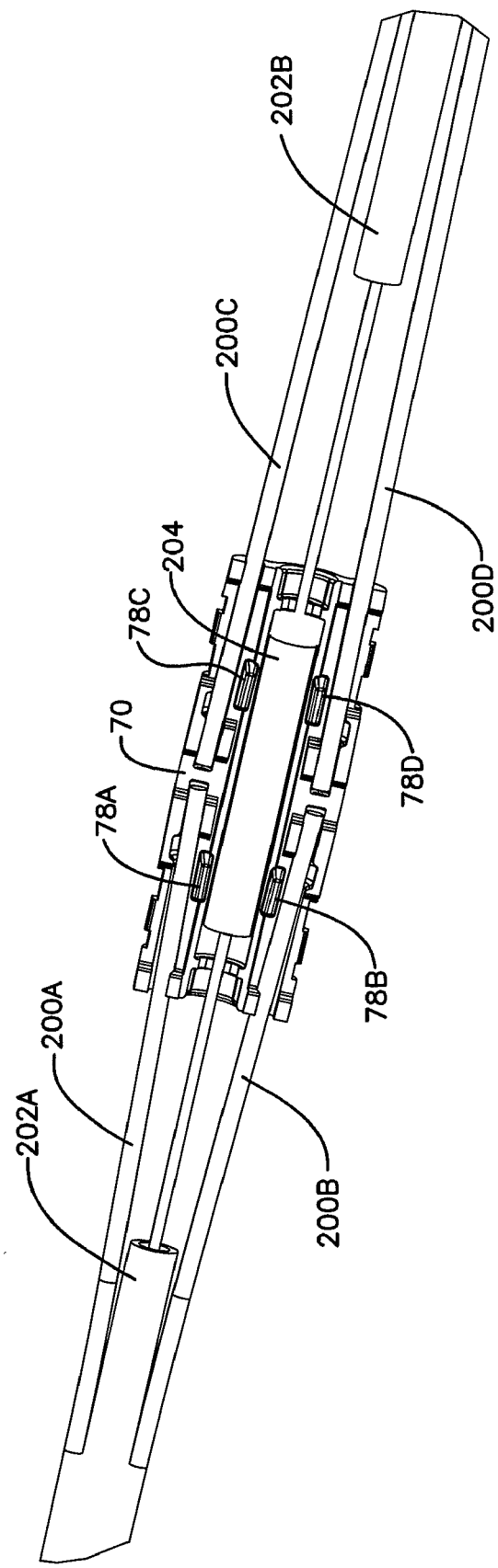
FIG. 11 is an illustration of an example splice area of a primary cable and a stub cable without the top splice enclosure component.

FIG. 11 is an illustration of an example splice area of a primary cable and a stub cable without top splice enclosure component 90. As illustrated in the example of FIG. 11, bottom splice enclosure component 70 rests within recess 128 of bottom cable enclosure component 120.

Furthermore, a strength member 200A of the primary cable rests within strength member channel 72A of bottom splice enclosure component 70 and a strength member 200B of the primary cable rests within strength member channel 72B of bottom splice enclosure component 70. A strength member 200C of the stub cable rests within strength member channel 72C of bottom splice enclosure component 70 and a strength member 200D of the stub cable rests within strength member channel 72D.

As illustrated in FIG. 11, a splicing tube 202A that covers the exposed optical fibers of the primary cable rests within splicing tube collar 84A of bottom splice enclosure component 70 and within splicing tube channel 130 of bottom cable enclosure component 120. A splicing tube 202B that covers the exposed optical fibers of the stub cable rests within splicing tube collar 84B of bottom splice enclosure component 70 and within splicing tube channel 136 of bottom cable enclosure component 120.

Furthermore, as illustrated in the example of FIG. 11, a splice protection sleeve 204 covers the interface between the optical fibers of the primary cable and the optical fibers of the stub cable and rests within splice protection sleeve channel 74 of bottom splice enclosure component 70.

Figure 12:
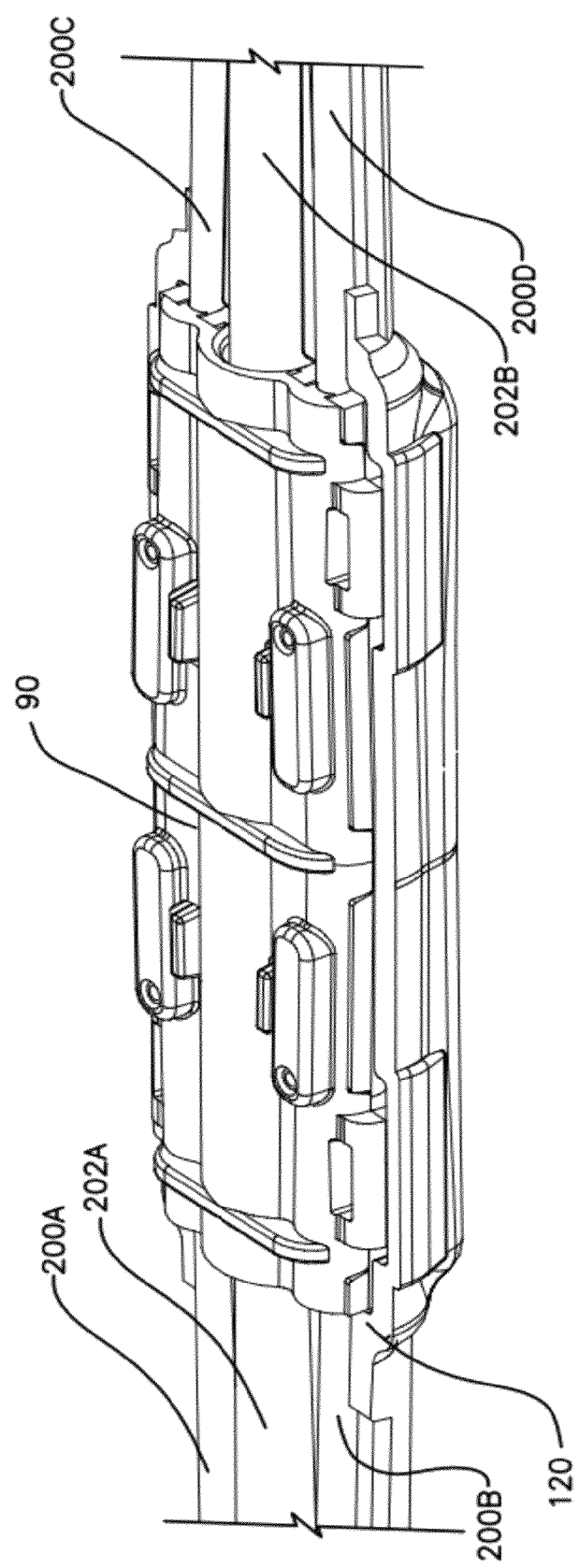
FIG. 12 is an illustration of an example splice area of a primary cable and a stub cable with the top splice enclosure component.

FIG. 12 is an illustration of an example splice area of the primary cable and the stub cable with top splice enclosure component 90. As illustrated in the example of FIG. 12, top splice enclosure component 90 is attached to bottom splice enclosure component 70. From the example of FIG. 12, it is apparent that top splice enclosure component 90 may cover splice protection sleeve 204.

Figure 13:
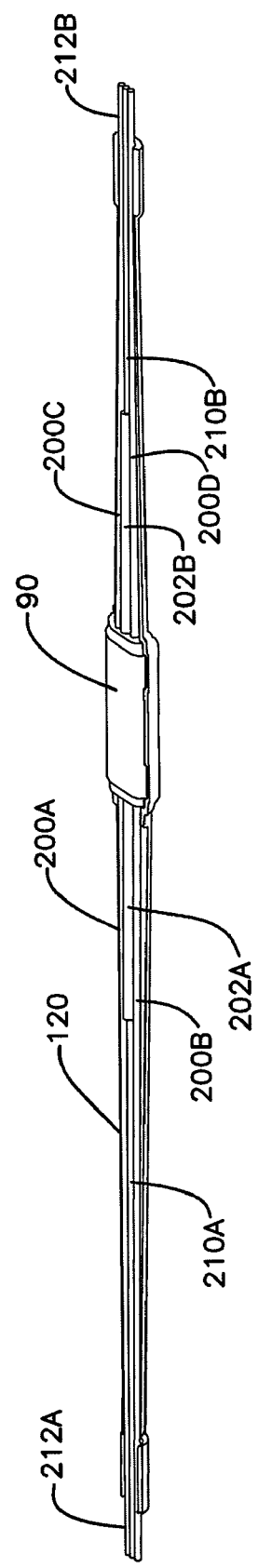
FIG. 13 is an illustration of an example assembled cable enclosure without a top cable enclosure component.

FIG. 13 is an illustration of an example assembled cable enclosure without top cable enclosure component 160. As illustrated in the example of FIG. 13, splicing tube 202A extends from the splice enclosure to a terminal segment of a buffer tube 210A of the primary cable. Buffer tube 210A rests within buffer tube channel 132 of bottom cable enclosure component 120. Furthermore, as illustrated in the example of FIG. 13, the terminal segment of buffer tube 210A extends out of a jacket 212A of the primary cable. An end portion of jacket 212A rests within jacket channel 134 of bottom cable enclosure component 120.

Similarly, as illustrated in the example of FIG. 13, splicing tube 202B extends from the splice enclosure to a terminal segment of a buffer tube 210B of the stub cable. Buffer tube 210B rests within buffer tube channel 176 of bottom cable enclosure component 120. Furthermore, as illustrated in the example of FIG. 13, the terminal segment of buffer tube 210B extends out of a jacket 212B of the stub cable. An end portion of jacket 212B rests within jacket channel 140 of bottom cable enclosure component 120.

As illustrated in the example of FIG. 13, strength member 200A is secured within the splice enclosure and extends from the end of jacket 212A. Similarly, strength member 200B is secured within the splice enclosure and extends from the end of jacket 212A. In addition, strength member 200B is secured within the splice enclosure and extends from the end of jacket 212A. Strength member 200A may rest within strength member channel 142 of bottom cable enclosure component 120 and strength member 200B may rest within strength member channel 144 of bottom cable enclosure component 120. Strength member 200C is secured within the splice enclosure and extends from the end of jacket 212B. Strength member 200D is secured within the splice enclosure and extends from the end of jacket 212B. Strength member 200C may rest within strength member channel 146 of bottom cable enclosure component 120 and strength member 200D may rest within strength member channel 148 of bottom cable enclosure component 120.

Figure 14:
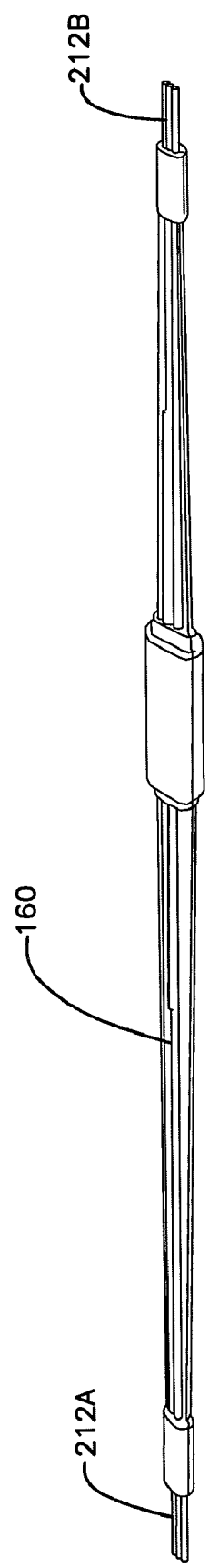
FIG. 14 is an illustration of an example assembled cable enclosure with a top cable enclosure component.

FIG. 14 is an illustration of an example assembled cable enclosure with top enclosure component 160. As illustrated in the example of FIG. 14, when top cable enclosure component 160 is positioned onto bottom cable enclosure component 120, the resulting cable enclosure encloses the splice enclosure, strength member 200A, strength member 200B, strength member 200C, strength member 200D, splicing tube 202A, splicing tube 202B, buffer tube 210A, and buffer tube 210B. The only exposed portion of the primary cable is jacket 212A and the only exposed portion of the stub cable is jacket 212B.

Although the forgoing description has been explained within the context of connectorizing a fiber optic cable, it should be appreciated that the operation illustrated in FIG. 2 and the components illustrated in FIGS. 3-14 may be used in the broader context of splicing together two fiber optic cables. For instance, the operation illustrated in FIG. 2 and the components illustrated in FIGS. 3-14 may be used to repair a fiber optic cable that was accidentally cut or damaged. Furthermore, the forgoing description has been explained in the context of a technician performing actions. It should be appreciated that some or all of the actions described above may be performed automatically by machines, including robots.

From the forgoing detailed description, it will be evident that modifications and variations can be made in the methods of the disclosure without departing from the spirit or scope of the disclosure.

What is claimed is:
1. A method comprising:
   providing a first cable that comprises:
      an optical fiber that is capable of transmitting light that conveys data;
      a buffer tube that surrounds the optical fiber;
      a strength member that provides additional tensile strength to the first cable; and
      a jacket that surrounds the strength member, the buffer tube, and the optical fiber;
   preparing the first cable such that a terminal segment of the optical fiber of the first cable is exposed, a terminal segment of the buffer tube of the first cable is exposed, and a terminal segment of the strength member of the first cable is exposed;
   providing a second cable that comprises:
      an optical fiber that is capable of transmitting light that conveys data;
      a buffer tube that surrounds the optical fiber;
      a strength member that provides additional tensile strength to the second cable; and
      a jacket that surrounds the strength member, the buffer tube, and the optical fiber;
   preparing the second cable such that a terminal segment of the optical fiber of the second cable is exposed, a terminal segment of the buffer tube of the second cable is exposed, and a terminal segment of the strength member of the second cable is exposed;
   splicing an exposed end of the optical fiber of the first cable to an exposed end of the optical fiber of the second cable;
   positioning a plurality of splice enclosure components onto the exposed terminal segment of the strength member of the first cable and the exposed terminal segment of the strength member of the second cable to form a splice enclosure that encloses the fused ends of the optical fiber of the first cable and the optical fiber of the second cable;
   positioning a plurality of cable enclosure components onto the splice enclosure to form a cable enclosure that encloses the splice enclosure, the exposed terminal segment of the buffer tube of the first cable, the exposed terminal segment of the buffer tube of the second cable, the exposed terminal segment of the strength member of the first cable, and the exposed terminal segment of the strength member of the second cable; and
   after forming the cable enclosure, sealing the cable enclosure.

2. The method of claim 1, further comprising:
prior to splicing the exposed end of the optical fiber of the first cable to the exposed end of the optical fiber of the second cable, stripping off an outer coating of the optical fiber of the first cable at the exposed end of the optical fiber of the first cable;
after stripping off the outer coating of the optical fiber of the first cable and prior to splicing the exposed end of the optical fiber of the first cable to the exposed end of the optical fiber of the second cable, cleaving the exposed end of the optical fiber of the first cable;
prior to splicing the exposed end of the optical fiber of the first cable to the exposed end of the optical fiber of the second cable, stripping off an outer coating of the optical fiber of the second cable at the exposed end of the optical fiber of the second cable; and
after stripping off the outer coating of the optical fiber of the second cable and prior to splicing the exposed end of the optical fiber of the first cable to the exposed end of the optical fiber of the second cable, cleaving the exposed end of the optical fiber of the second cable.

3. The method of claim 1, further comprising:
prior to splicing the exposed end of the optical fiber of the first cable to the exposed end of the optical fiber of the second cable, positioning a splice protection sleeve over the optical fiber of the first cable; and
after splicing the exposed end of the optical fiber of the first cable to the exposed end of the optical fiber of the second cable and prior to positioning the plurality of splice enclosure components, repositioning the splice protection sleeve over the fused ends of the optical fiber of the first cable and the optical fiber of the second cable,
wherein the splice enclosure encloses the splice protection sleeve.

4. The method of claim 1, further comprising:
prior to splicing the exposed end of the optical fiber of the first cable to the exposed end of the optical fiber of the second cable, positioning a first splicing tube over the exposed terminal segment of the buffer tube of the first cable;
prior to splicing the exposed end of the optical fiber of the first cable to the exposed end of the optical fiber of the second cable, positioning a second splicing tube over the exposed terminal segment of the buffer tube of the second cable;
after positioning the plurality of splice enclosure components, repositioning the first splicing tube such that the first splicing tube covers a portion of the exposed terminal segment of the optical fiber of the first cable that extends from the splicing enclosure to an end of the exposed terminal segment of the buffer tube of the first cable; and
after positioning the plurality of splice enclosure components, repositioning the second splicing tube such that the first splicing tube covers a portion of the exposed terminal segment of the optical fiber of the second cable that extends from the splicing enclosure to an end of the exposed terminal segment of the buffer tube of the second cable,
wherein the cable enclosure encloses the first splicing tube and the second splicing tube.

5. The method of claim 1, further comprising:
prior to positioning the plurality of splice enclosure components, trimming the exposed terminal segment of the strength member of the first cable such that the exposed terminal segment of the optical fiber of the first cable extends beyond an end of the exposed terminal segment of the strength member of the first cable; and
prior to positioning the plurality of splice enclosure components, trimming the exposed terminal segment of the strength member of the second cable such that the exposed terminal segment of the optical fiber of the second cable extends beyond an end of the exposed terminal segment of the strength member of the second cable.

6. The method of claim 1, wherein sealing the cable enclosure comprises:
positioning a heat shrink tube over the cable enclosure; and
applying heat to the heat shrink tube.

7. The method of claim 1, wherein positioning the plurality of splice enclosure components comprises positioning a first splice enclosure component onto a second splice enclosure component.

8. The method of claim 7, further comprising:
after splicing the exposed end of the optical fiber of the first cable to the exposed end of the optical fiber of the second cable and prior to positioning the first splice enclosure component onto the second splice enclosure component, positioning a portion of the exposed terminal segment of the strength member of the first cable into a first strength member channel of the first splice enclosure component; and
after splicing the exposed end of the optical fiber of the first cable to the exposed end of the optical fiber of the second cable and prior to positioning the first splice enclosure component onto the second splice enclosure component, positioning a portion of the exposed terminal segment of the strength member of the second cable into a second strength member channel of the first splice enclosure component.

9. The method of claim 7, wherein positioning the plurality of splice enclosure components comprises snapping an attachment flange of the first splice enclosure component over an attachment ridge of the second splice enclosure component.

10. The method of claim 1, wherein the first cable further comprises a connector.

11. The method of claim 1, further comprising:
after forming the splice enclosure and prior to forming the cable enclosure, securing the strength member of the first cable into the splice enclosure; and
after forming the splice enclosure and prior to forming the cable enclosure, securing the strength member of the second cable into the splice enclosure.

12. The method of claim 11, wherein securing the strength member of the first cable into the splice enclosure comprises:
injecting epoxy into the splice enclosure; and
after injecting the epoxy, heat curing the epoxy.

13. The method of claim 1, wherein positioning the plurality of cable enclosure components comprises positioning a first cable enclosure component onto a second cable enclosure component.

14. The method of claim 13, wherein the first cable enclosure component and the second cable enclosure component comprise splice enclosure retention regions that are shaped to accommodate the splice enclosure.

15. The method of claim 1, wherein positioning the plurality of cable enclosure components comprises positioning the plurality of cable enclosure components such that a first end of the cable enclosure covers the jacket of the first cable and a second end of the cable enclosure covers the jacket of the second cable.

16. The method of claim 1,
wherein preparing the first cable comprises:
  stripping off a portion of the jacket of the first cable; and
  stripping off a portion of the buffer tube of the first cable; and
wherein preparing the second cable comprises:
  stripping off a portion of the jacket of the second cable; and
  stripping off a portion of the buffer tube of the second cable.

17. A spliced cable comprising:
a first cable that comprises:
  an optical fiber that is capable of transmitting light that conveys data;
  a buffer tube that surrounds the optical fiber, except for a terminal segment of the optical fiber;
  a strength member that provides additional tensile strength to the first cable; and
  a jacket that surrounds the strength member, the buffer tube, and the optical fiber, except for a terminal segment of the buffer tube, a terminal segment of the strength member, and the terminal segment of the optical fiber;
a second cable that comprises:
  an optical fiber that is capable of transmitting light that conveys data;
  a buffer tube that surrounds the optical fiber, except for a terminal segment of the optical fiber;
  a strength member that provides additional tensile strength to the second cable; and
  a jacket that surrounds the strength member, the buffer tube, and the optical fiber, except for a terminal segment of the buffer tube, a terminal segment of the strength member, and the terminal segment of the optical fiber;
wherein an end of the terminal segment of the optical fiber of the first cable is spliced to an end of the terminal segment of the optical fiber of the second cable;
wherein an opposite end of the second cable is connectorized;
a splice protection sleeve that surrounds a segment of the optical fiber of the first cable and a segment of the optical fiber of the second cable at a point where the optical fiber of the first cable is spliced to the optical fiber of the second cable;
a plurality of splice enclosure components that form a splice enclosure that encloses the fused ends of the optical fiber of the first cable and the optical fiber of the second cable, the splice protection sleeve, the strength member of the first cable, and the strength member of the second cable;
a first splicing tube that surrounds a portion of the exposed terminal segment of the optical fiber of the first cable that extends from the splice enclosure to an end of the exposed terminal segment of the buffer tube of the first cable;
a second splicing tube that surrounds a portion of the exposed terminal segment of the optical fiber of the second cable that extends from the splice enclosure to an end of the exposed terminal segment of the buffer tube of the second cable;
a plurality of cable enclosure components that form a cable enclosure that encloses the splice enclosure, the exposed terminal segment of the buffer tube of the first cable, the exposed terminal segment of the buffer tube of the second cable, the exposed terminal segment of the strength member of the first cable, the exposed terminal segment of the strength member of the second cable, the first splicing tube, and the second splicing tube; and
a seal that seals the cable enclosure.

18. The spliced optical fiber of claim 17, wherein the seal is a heat shrink tube.

19. A cable enclosure for enclosing a splice between two fiber optic cables, the cable enclosure comprising:
  a splice protection sleeve shaped to surround a segment of an optical fiber of a first cable and a segment of an optical fiber of a second cable at a point where the optical fiber of the first cable is spliced to the optical fiber of the second cable;
  a plurality of splice enclosure components that form a splice enclosure shaped to enclose the fused ends of the optical fiber of the first cable and the optical fiber of the second cable, the splice protection sleeve, a strength member of the first cable, and a strength member of the second cable;
  a first splicing tube shaped to surround a portion of an exposed terminal segment of the optical fiber of the first cable, the portion of the exposed terminal segment of the optical fiber of the first cable extending from the splice enclosure to an end of an exposed terminal segment of a buffer tube that surrounds the optical fiber of the first cable;
  a second splicing tube that surrounds a portion of an exposed terminal segment of the optical fiber of the second cable, the portion of the exposed terminal segment of the optical fiber of the second cable extending from the splice enclosure to an end of an exposed terminal segment of a buffer tube that surrounds the optical fiber of the second cable;
  a plurality of cable enclosure components that are shaped to form a cable enclosure that encloses the splice enclosure, the exposed terminal segment of the buffer tube of the first cable, the exposed terminal segment of the buffer tube of the second cable, an exposed terminal segment of the strength member of the first cable, an exposed terminal segment of the strength member of the second cable, the first splicing tube, and the second splicing tube; and
  a seal that seals the cable enclosure.

20. The cable enclosure of claim 19, wherein at least one of the splice enclosure components includes an epoxy injection aperture through which epoxy is injected to seal the terminal segment of the strength member of the first cable and the terminal segment of the strength member of the second cable within the splice enclosure.

21. The cable enclosure of claim 19, wherein the cable enclosure covers a terminal segment of a jacket of the first cable and a terminal segment of a jacket of the second cable.

22. The cable enclosure of claim 19, wherein the seal is a heat shrink tube.

* * * * *